(12) United States Patent
Flajnik et al.

(10) Patent No.: US 10,889,250 B2
(45) Date of Patent: Jan. 12, 2021

(54) EXPANDABLE CARGO BOX ASSEMBLY FOR A PICKUP TRUCK

(71) Applicant: ABC TECHNOLOGIES INC., Toronto (CA)

(72) Inventors: David Flajnik, Rochester Hills, MI (US); Harman Gill, Brampton (CA); Avinash Jayakumar, Mississauga (CA); Usman Dulatov, Newmarket (CA)

(73) Assignee: ABC TECHNOLOGIES INC., Toronto (CA)

( * ) Notice: Subject to any disclaimer, the term of this patent is extended or adjusted under 35 U.S.C. 154(b) by 0 days.

(21) Appl. No.: 16/516,056

(22) Filed: Jul. 18, 2019

(65) Prior Publication Data

US 2020/0023784 A1    Jan. 23, 2020

Related U.S. Application Data

(60) Provisional application No. 62/700,075, filed on Jul. 18, 2018.

(51) Int. Cl.
*B60R 9/06* (2006.01)
*B62D 33/02* (2006.01)

(52) U.S. Cl.
CPC .......... *B60R 9/065* (2013.01); *B62D 33/0207* (2013.01)

(58) Field of Classification Search
CPC ............. B60R 2011/0082; B60R 9/055; B60R 2011/0094; B65D 9/14; B65D 7/26
See application file for complete search history.

(56) References Cited

U.S. PATENT DOCUMENTS

| | | | | |
|---|---|---|---|---|
| 1,016,523 A | * | 2/1912 | Rinner | B65D 9/14 217/14 |
| 1,179,445 A | * | 4/1916 | Manning | B60R 7/043 296/37.5 |
| 1,822,585 A | * | 9/1931 | Douglas | B65D 9/14 217/14 |
| 1,972,483 A | * | 9/1934 | Hartson | B65D 7/26 220/6 |
| 2,573,089 A | * | 10/1951 | Armenia | B65D 9/14 217/15 |
| 3,746,203 A | * | 7/1973 | Cipolla | B65D 7/26 220/6 |
| 4,469,364 A | * | 9/1984 | Rafi-Zadeh | B60R 11/06 224/404 |

(Continued)

*Primary Examiner* — Brian D Nash
(74) *Attorney, Agent, or Firm* — Medler Ferro Woodhouse & Mills PLLC

(57) ABSTRACT

Provided is an expandable cargo box assembly for mounting on a side wall section of a cargo bed. The cargo box assembly comprises a base member for attaching the expandable cargo box assembly to the side wall section. The base member supports a folding floor assembly and forward and rearward collapsible walls at each end of the base member. The cargo box assembly also includes an inner wall plate attached to the forward and rearward collapsible walls opposite to the base member. The base member, the folding floor assembly, the forward and rearward collapsible walls and the inner wall plate collectively define an expandable enclosure that can be positioned in a stowed position when not in use, and is configured to expand to a deployed position to receive cargo.

19 Claims, 22 Drawing Sheets

(56) References Cited

U.S. PATENT DOCUMENTS

| | | | | |
|---|---|---|---|---|
| 5,299,704 | A * | 4/1994 | Thorby | B65D 7/26 |
| | | | | 220/6 |
| 6,507,701 | B2 * | 1/2003 | Lake | B60R 9/00 |
| | | | | 296/26.11 |
| 7,036,861 | B2 * | 5/2006 | Steffens | B60R 7/08 |
| | | | | 224/404 |
| 8,167,387 | B1 * | 5/2012 | Quinn | A47B 43/00 |
| | | | | 312/258 |
| 2002/0179600 | A1 * | 12/2002 | King | B60R 9/00 |
| | | | | 220/6 |
| 2005/0242138 | A1 * | 11/2005 | Warganich | B60R 7/02 |
| | | | | 224/404 |
| 2010/0264180 | A1 * | 10/2010 | Allotey | B60R 11/06 |
| | | | | 224/404 |
| 2018/0002063 | A1 * | 1/2018 | Su | B65D 7/26 |
| 2020/0023782 | A1 * | 1/2020 | Gill | B60R 7/043 |
| 2020/0223370 | A1 * | 7/2020 | Jayakumar | B60R 9/02 |

* cited by examiner

EXPANDABLE CARGO BOX ASSEMBLY FOR A PICKUP TRUCK

FIELD OF THE INVENTION

The present invention pertains to the field of cargo holders, in particular to an expandable cargo box for use in the cargo bed of a pickup truck.

BACKGROUND

Pickup trucks have functional attributes that permit them to be used for a range of applications. This is evident in the market, as pickup trucks are immensely popular for both recreational and work-related transport. Pickup trucks are now available in a range of configurations, but are generally regarded as providing an enclosed cab, for the driver and passengers, and an open rear cargo bed. Although the cargo bed is bordered by two sidewall sections, and a rear tailgate, the top side of the cargo bed is open, therein resulting in certain issues relating to security, privacy and general securement of items contained therein.

To ensure items placed within the cargo area are protected from being stolen and/or vandalized, and to prevent inadvertent loss due to items falling out of the cargo bed during transport, a variety of cargo bed storage systems have been proposed. While traditional cargo bed storage systems have found great utility in transporting a range of items, they can be cumbersome and take up valuable cargo space in the cargo bed, which is a disadvantage when the full cargo bed is needed to be used. It is therefore desirable to provide a storage system that is functional yet can be stowed away to avoid taking up space in the cargo bed when not in use.

SUMMARY

According to an aspect of the disclosure, provided is an expandable cargo box assembly for mounting on a side wall section of a cargo bed. The cargo box assembly comprises a base member for attaching the expandable cargo box assembly to the side wall section. The base member supports a folding floor assembly and forward and rearward collapsible walls at each end of the base member. The cargo box assembly also includes an inner wall plate attached to the forward and rearward collapsible walls opposite to the base member. The base member, the folding floor assembly, the forward and rearward collapsible walls and the inner wall plate collectively define an expandable enclosure that can be positioned in a stowed position when not in use, and is configured to expand to a deployed position to receive cargo.

BRIEF DESCRIPTION OF THE DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF EMBODIMENTS OF THE PRESENT INVENTION

Figure 1:
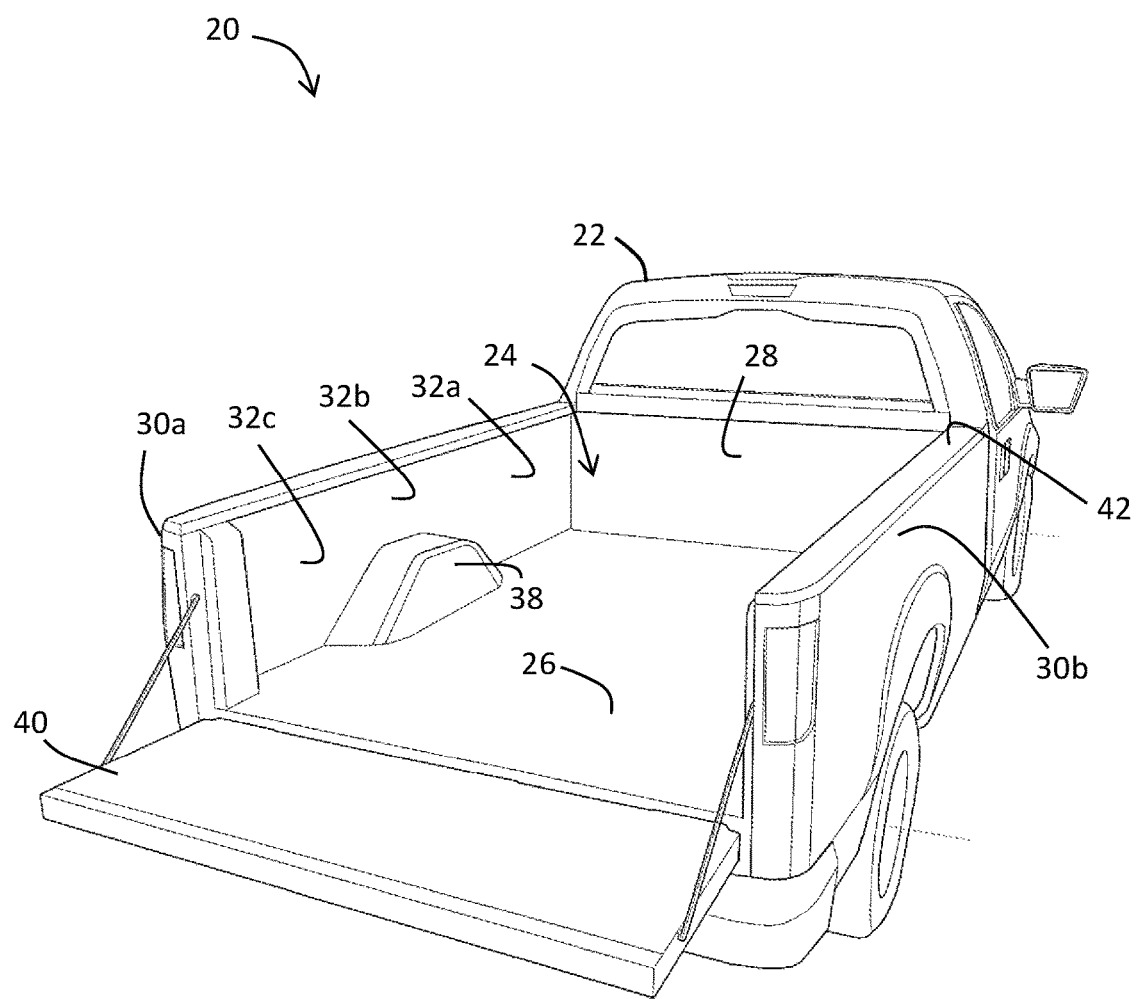
FIG. 1 is a perspective view of a pickup truck.

Specific embodiments of the present invention will now be described with reference to the figures, wherein like reference numbers indicate identical or functionally similar elements. The following detailed description is merely exemplary in nature and is not intended to limit the disclosure or the application and uses of the disclosure. A person skilled in the relevant art will recognize that other configurations and arrangements can be used without departing from the scope of the disclosure. Furthermore, there is no intention to be bound by any expressed or implied theory presented in the preceding technical field or the following detailed description.

It should be noted that in the description, terms such as forward, front and derivations of these terms are intended to mean or refer to an orientation directed towards, or a location situated towards the front of the vehicle or component in question relative to its orientation within a vehicle. Similarly, terms such as rearward, rear and derivations of these terms are intended to mean or refer to an orientation directed towards, or a location situated towards the back of the vehicle or component in question relative to its orientation within a vehicle. Terms such as up, upper, upward, and derivations of these terms are intended to mean or refer to an orientation that is above or on a top-side of the vehicle or component in question relative to its orientation within a vehicle. Terms such as lower, down, downward, and derivations of these terms are intended to mean or refer to an orientation that is below or on a bottom-side vehicle or component in question relative to its orientation within a vehicle. The term outer, outboard, outside and derivations of these terms is intended to mean or refer to an orientation directed towards, or a location situated outwardly from the side of the vehicle or component in question relative to its orientation within a vehicle. The term inner, inboard, inside and derivations of these terms is intended to mean or refer to an orientation directed towards, or a location situated towards the longitudinal centerline of the vehicle, or component in question relative to its orientation within a vehicle.

In addition, the terms "preferably," or "in particular," "for example" or similar terms are used in association with optional features without thereby restricting alternative embodiments. Thus, features which are introduced by these terms are optional features, and there is no intention to restrict the scope of protection of the claims and, in particular, the independent claims by means of these features. Thus, as a person skilled in the art will recognize, the invention can also be implemented using different embodiments. In a similar way, features which are introduced by "in one embodiment of the invention" or by "in one illustrative embodiment of the invention" are understood to be optional features without any intention thereby to restrict alternative embodiments or the scope of protection of the independent claims. Moreover, these introductory expressions are not intended to affect all the ways of combining the features introduced thereby with other features, whether optional or non-optional features.

Construction

Referring now to FIG. 1, shown is a pickup truck 20 having a cab 22 and a cargo bed 24 situated rearward therefrom. The cargo bed 24 comprises a floor 26, an upstanding forward wall 28 immediately adjacent and rearward of the cab 22, and two upstanding opposing side wall sections, namely a first side wall section 30a and a second side wall section 30b. Each side wall section 30a, 30b includes a forward side wall portion 32a, an intermediate side wall portion 32b, and a rearward side wall portion 32c, which are collectively referred to herein as the side wall portion 32. The forward and rearward side wall portions 32a, 32c are separated by a wheel well 38, and the intermediate side wall portion 32b is situated or disposed generally above the wheel well 38. Opposite to the forward wall 28 towards the rear of the cargo bed 24 is a tailgate 40. The tailgate 40 is provided with a hinge assembly (not shown) permitting the tailgate 40 to pivot from a generally vertical/upright closed position, to a generally horizontal open position as required by the operator. As shown, the tailgate 40 is in the open position. The forward wall 28 and the two opposing side wall sections 30a, 30b define an upper wall surface that is generally planar. The upper wall surface is collectively regarded as the bed rail 42.

Figure 2:
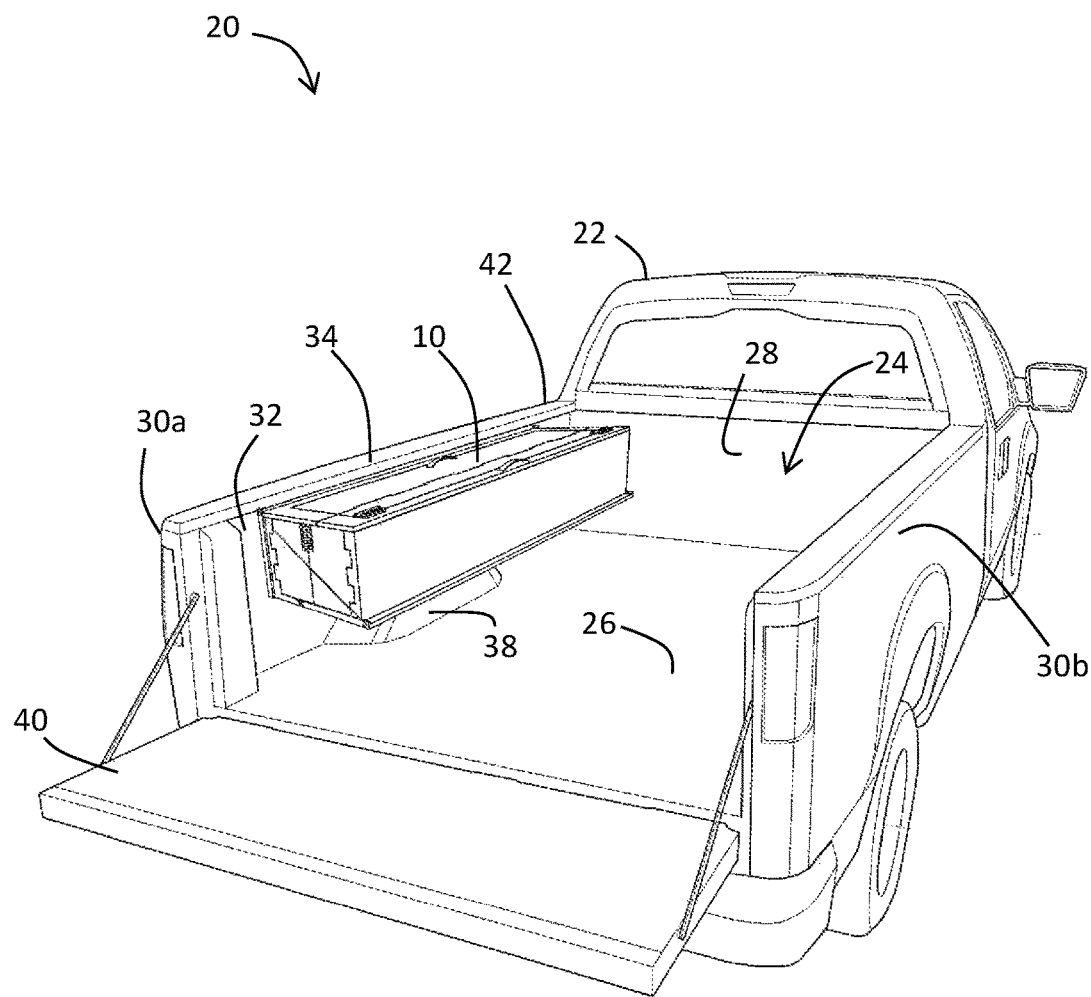
FIG. 2 is a perspective view of the pickup truck having an expandable cargo box assembly according to an embodiment of the invention, the expandable cargo box assembly shown in a deployed position.

Referring now to FIG. 2, shown mounted to the side wall portion 32 of the first side wall section 30a is an expandable cargo box assembly 10 shown in an expanded or deployed state or position. As will be described in more detail, the cargo box assembly 10 is configured to be positioned in a stowed position when not in use and is configured to expand to the expanded or deployed position to receive cargo when in use. The cargo box assembly 10 is configured to be mounted upon the side wall sections 30a, 30b of the cargo bed 24, in particular the area defined by the side wall portion 32 above the wheel well 38. Depending on the intended purpose and required functionality, a cargo bed 24 may contain a single cargo box assembly 10, or a pair of cargo box assemblies 10 with one placed on each side of the cargo bed 24. To simplify the description which follows, the cargo box assembly 10 will be described with reference to being mounted upon the side wall portion 32 of the side wall section 30a.

Figure 3:
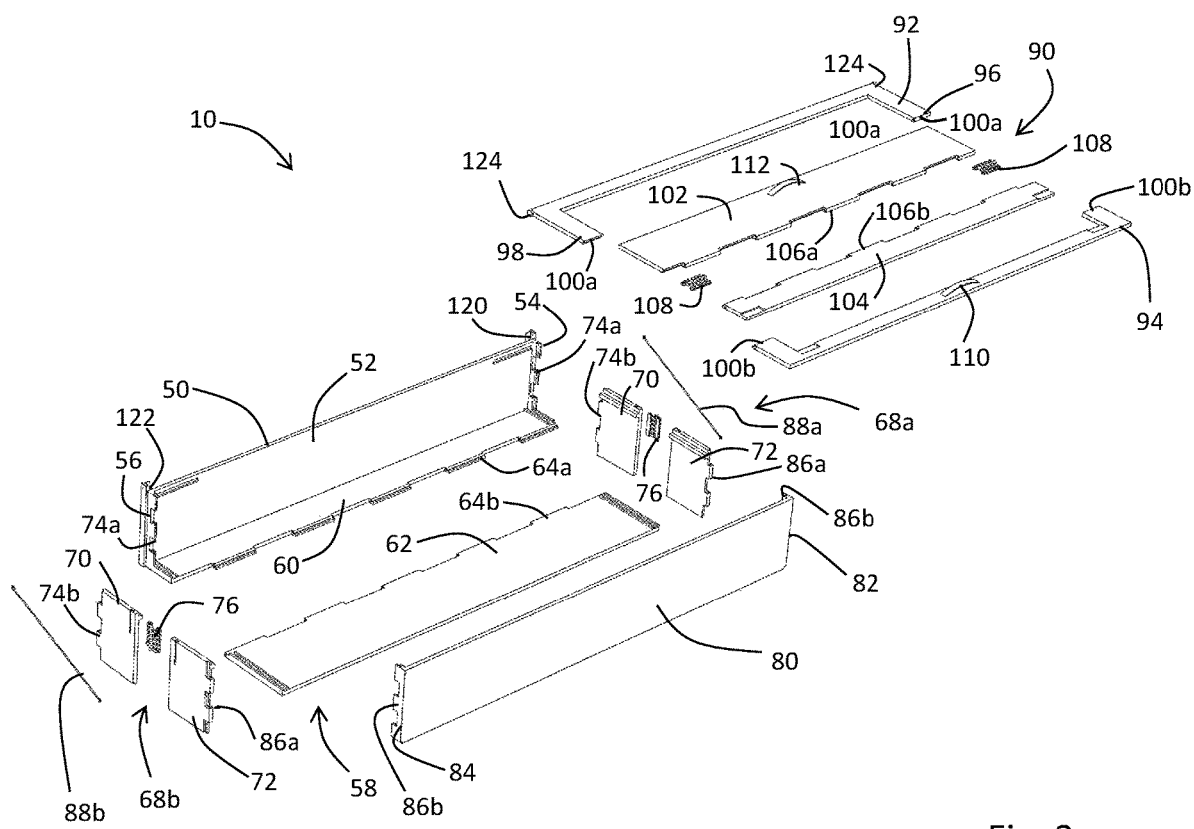
FIG. 3 is an exploded perspective view of the expandable cargo box assembly according to FIG. 2.
Figure 4:
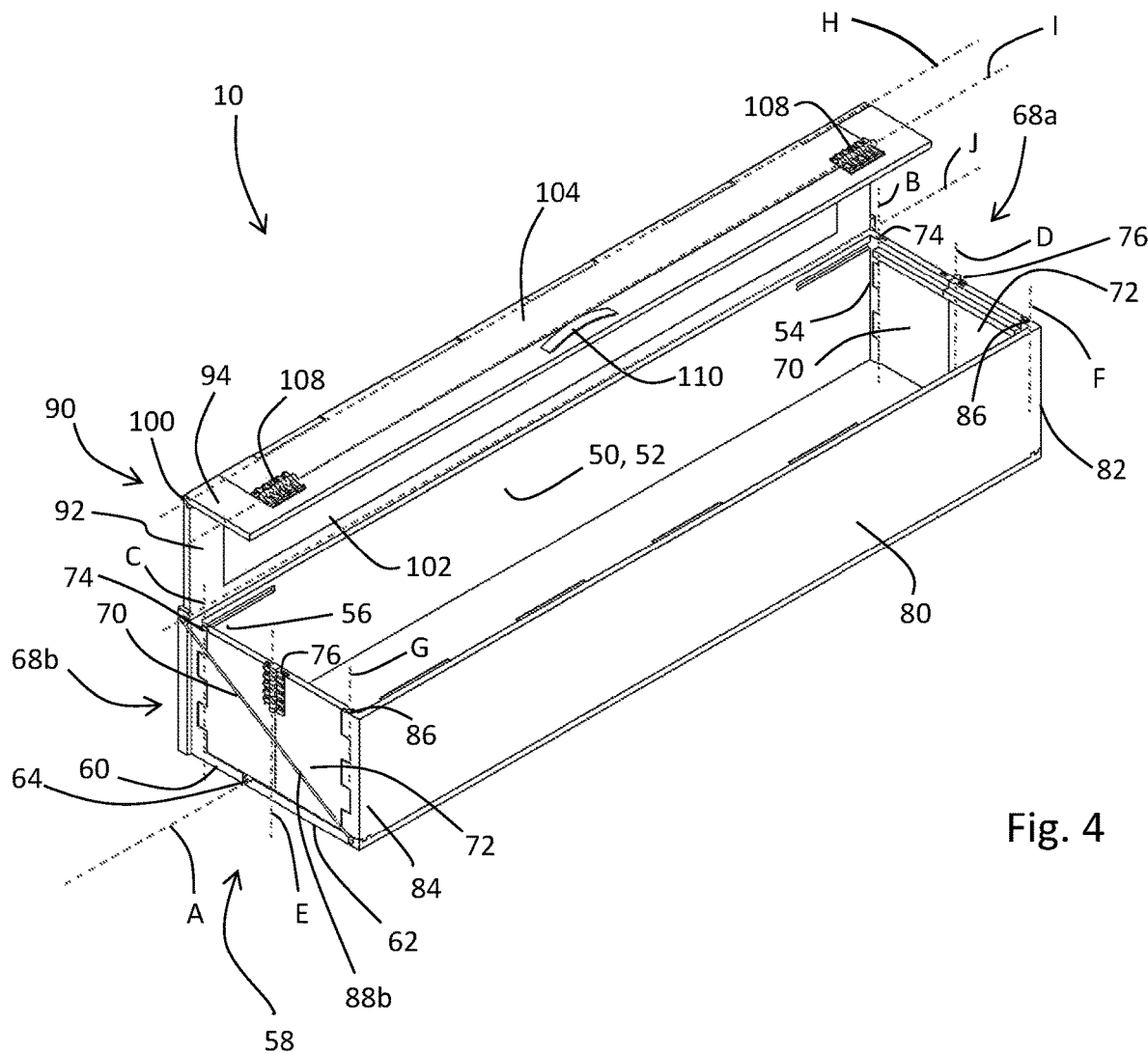
FIG. 4 is a perspective view of the expandable cargo box assembly according to FIG. 2, shown in isolation.

With reference now to FIGS. 3 and 4, the cargo box assembly 10 includes a base member 50 that is configured to be mounted to the side wall portion 32 of the side wall section 30a of the cargo bed 24. The base member 50 generally includes an outer wall plate 52 having a forward end 54 and a rearward end 56. Fixedly attached to the base member 50 is a folding floor assembly 58, which includes an inner floor panel 60, and an outer floor panel 62. As shown, the inner floor panel 60 is fixedly attached perpendicularly to a lower longitudinal edge of the outer wall plate 52 of the base member 50. The outer floor panel 62 is pivotally connected to the inner floor panel 60 by way of a suitable hinge 64 having cooperating portions 64a, 64b as shown in FIG. 3, which are arranged to permit the outer floor panel 62 pivot about pivot axis A as shown in FIG. 4.

At each of the forward and rearward ends 54, 56 of the base member 50 there is operably mounted a respective collapsible wall 68a, 68b. Each collapsible wall 68a, 68b includes a first wall member 70, and a second wall member 72. As shown, for the forward collapsible wall 68a mounted at the forward end 54 of the base member 50, the first wall member 70 is pivotally attached to the base member 50, using a suitable hinge 74 having cooperating portions 74a, 74b as shown in FIG. 3, which are arranged to permit the first wall member 70 to pivot about pivot axis B. Similarly, for the rearward collapsible wall 68b mounted at the rearward end 56 of the base member 50, the first wall member 70 is pivotally attached to the base member 50, using a suitable hinge 74 having cooperating portions 74a, 74b as shown in FIG. 3, which are arranged to permit the first wall member 70 to pivot about pivot axis C.

In turn, for each of the forward and rearward collapsible walls 68a, 68b, the respective first and second wall members 70, 72 are pivotally attached to each other using a suitable hinge. As shown, the first and second wall members 70, 72 for the forward collapsible wall 68a are arranged to pivot about pivot axis D, while the first and second wall members 70, 72 for the rearward collapsible wall 68b are arranged to pivot about pivot axis E.

Situated opposite the base wall 50, and in particular the outer wall plate 52, is an inner wall plate 80. The inner wall plate 80 is supported on a forward end 82 by the forward collapsible wall 68a, and is supported on a rearward end 84 by the rearward collapsible wall 68b. Accordingly, the forward end 82 of the inner wall plate 80 is pivotally attached to the second wall member 72 of the forward collapsible wall 68a, using a suitable hinge 86 having cooperating portions 86a, 86b as shown in FIG. 3, which are arranged to pivot about pivot axis F, while the rearward end 84 of the inner wall plate 80 is pivotally attached to the second wall member 72 of the rearward collapsible wall 68b, using a suitable hinge 86 having cooperating portions 86a, 86b as shown in FIG. 3, which are arranged to pivot about pivot axis G.

As shown, the cargo box assembly 10 also includes a forward support member 88a and a rearward support member 88b to provide additional load-bearing support to the assembly. As shown, the forward and rearward support members 88a, 88b extend from an upper anchorage point on the outer wall plate 52 diagonally down to a distal end of the outer floor panel 62 as see in FIG. 4.

The cargo box assembly 10 is also provided with a lid assembly 90 that permits the deployed storage box to be covered and/or locked as necessary. The lid assembly 90 includes a first lid member 92 and a second lid member 94, the second lid member 94 being pivotally attached to the first lid member 92 at both a forward end 96 and a rearward end 98 using suitable hinges 100 having cooperating portions 100a, 100b as shown in FIG. 3, which are arranged to pivot about pivot axis H. The lid assembly 90 may also include an access port. As shown, the access port includes a first access panel 102 and a second access panel 104. To permit the lid assembly 90 to articulate around pivot axis H, the first access panel 102 and the second access panel 104 are pivotally attached to each other using a suitable hinge 106, having cooperating portions 106a, 106b as shown in FIG. 3, which are also arranged to pivot about pivot axis H. Stated another way, the hinge 106 between the first access panel 102 and the second access panel 104 and the hinges 100 between the first lid member 92 and the second lid member 94 are aligned to pivot axis H. It will be appreciated that to permit the access port to open relative to the first and second lid members 92, 94, the hinge 106 interconnecting the first and second access panels 102, 104 are discontinuous relative to the adjacent hinges 100 interconnecting the first and second lid members 92, 94. The access port is pivotally attached to the lid assembly 90, in particular the second lid member 94 using a suitable hinge 108 arranged to pivot about pivot axis I. As shown, the lid assembly 90 also includes a first handle 110 to enable control of the first and second lid members 92, 94, and where an access port is provided, a second handle 112 may also be provided.

Figure 8A:
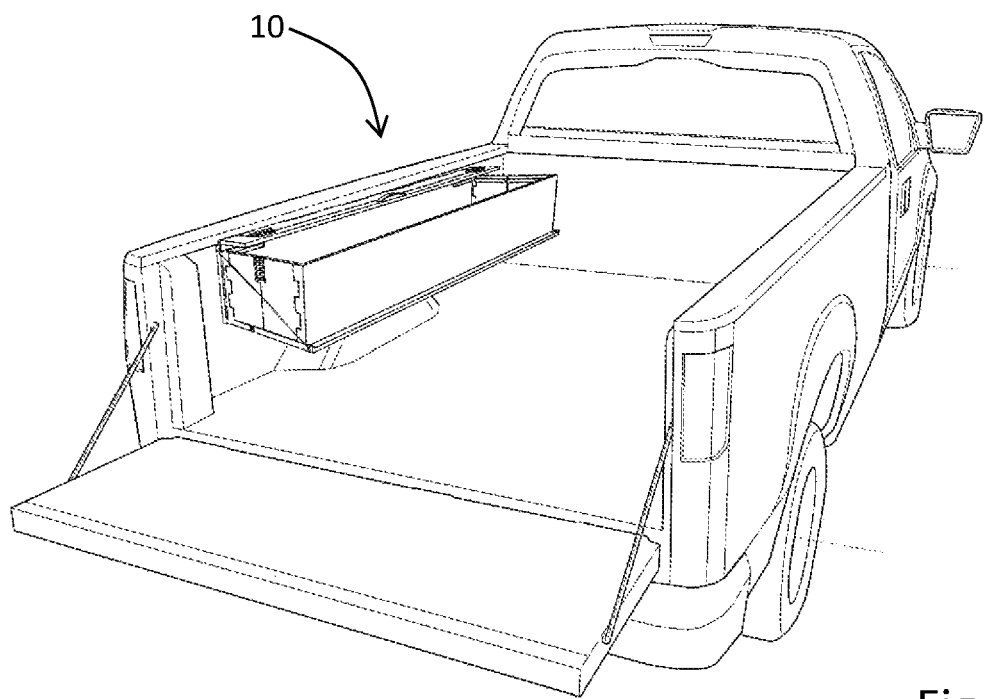
FIGS. 8a to 8c provide details on the expandable cargo box assembly according to FIG. 2, shown at a third step in the deployment of the assembly.
Figure 10A:
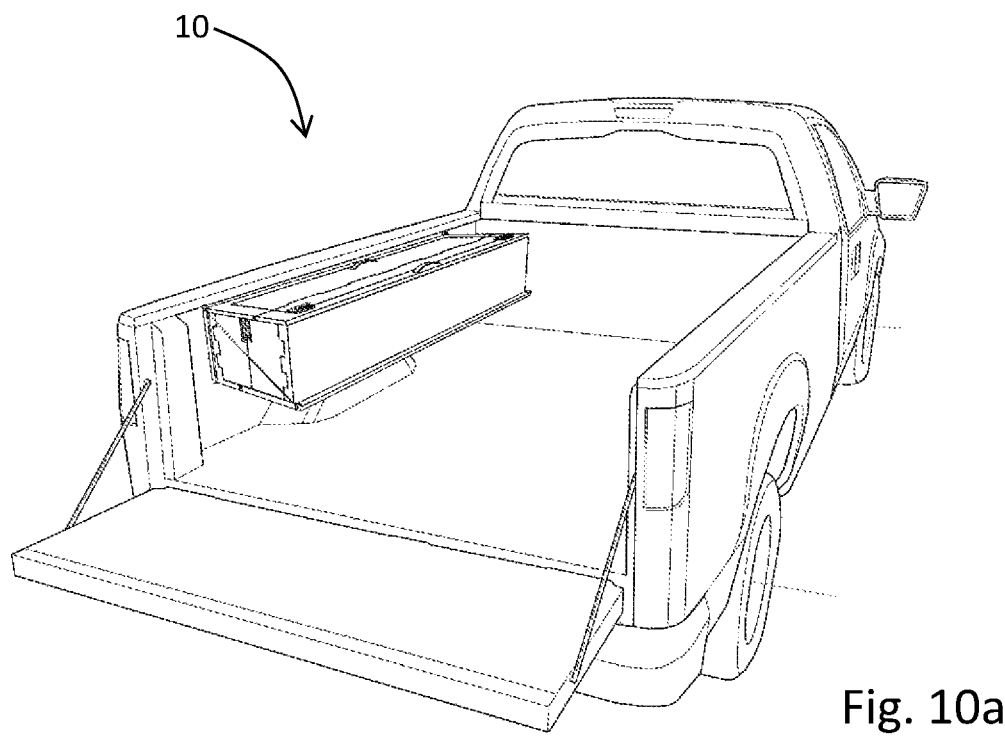
FIGS. 10a to 10c provide details on the expandable cargo box assembly according to FIG. 2, shown at a fifth step in the deployment of the assembly.

As will be seen in greater detail below, the first lid member 92 is configured to seat or nest within a pocket defined by the base member 50 when the cargo box assembly 10 is arranged in the stowed position. As shown, the outboard side of the base member 50 is provided with a first channel 120 located at the forward end 54, and a second channel 122 located at the rearward end 56. The first lid member 92 is provided at each end with a guide member 124 that positions within the respective channels 120, 122, such that the first lid member 92 can be moved from the first stowed position as shown in FIG. 8a, to the second deployed position as shown in FIG. 10a. The guide member 124 may take the form of roller wheels, or any other suitable form that permits for movement through the channels 120, 122. It will also be appreciated that other mechanical means to achieve the desired path of motion may be implemented. As will be evident in the deployment discussion which follows, in the stowed position, the first lid member 92 positions in a generally upright configuration within the pocket defined between the first and second channels 120, 122. In this position, the first lid member 92 is located adjacent the side wall portion 32. During deployment, the first lid member 92 is lifted upwards from this pocket, and once at its limit of vertical travel, pivots about pivot axis J to assume a generally horizontal position.

Figure 5A:
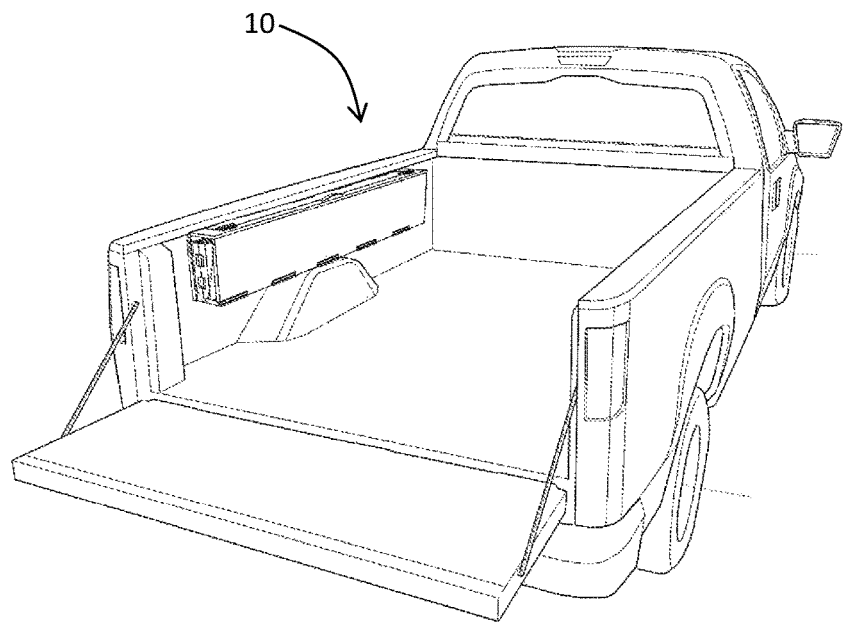
FIGS. 5a to 5c provide details on the expandable cargo box assembly according to FIG. 2, shown in the stowed position.

The cargo box assembly 10 is configured to be deployed from a first stowed position, as shown for example in FIG. 5a, to a second expanded or deployed position, as shown for example in FIG. 10a Accordingly, it will be appreciated that in the deployed position, the base member 50 (or the outer wall plate 52), the inner wall plate 80, and the forward and rearward collapsible walls 68a, 68b form an upright enclosure that in cooperation with the folding floor assembly 58, delimits a volume available for cargo storage. Stated another way, the base member 50 (or the outer wall plate 52), the inner wall plate 80, the folding floor assembly 58, and the forward and rearward collapsible walls 68a, 68b collectively define an expandable enclosure that can be positioned in the stowed position when not in use and can be positioned in the expanded or deployed position to receive cargo.

Materials

The cargo box assembly, and in particular the components that establish the overall structure of the assembly, for example the base wall and the various wall elements may be manufactured from any suitable plastic material including, but not limited to polypropylene, nylon or polyamide, high-density polyethylene, acrylonitrile butadiene styrene, acrylonitrile butadiene styrene or polycarbonate, ethylene propylene diene monomer, polypropylene-ethylene propylene diene monomer, and thermoplastic elastomers.

The use of plastics may be further enhanced by using fillers, including but not limited to natural fibers, glass fiber, virgin and/or recycled carbon fiber, colors/dyes, as well as fillers that confer UV resistance and/or chemical resistance. The panels could also be constructed out of polyurethane composite board sandwich materials, or other composite materials such as recycled carbon fiber boards, and be either injection molded, blow molded, compression molded, extruded, thermoformed or some combination of the aforementioned processes. It will also be appreciated that the cargo box assembly may be manufactured from a combination of materials.

Hinges

The hinges implemented in the exemplified embodiment, in particular those defining pivot axes A, B, C, F, G and H, may be barrel-type hinges, as generally known in the art. In brief, with this hinge arrangement, each of the cooperating elements (i.e. walls and/or panels) operably attached at the defined pivot axis include a plurality of integrally formed barrels that are arranged and assembled to provide an articulating joint that is generally maintained in the assembled state by virtue of a hinge pin situated therein. It will be appreciated, however, that other hinge designs may be suitably implemented. It will be further appreciated that the hinges may be separately formed metallic components and/or plastic components. It may also be possible for implement living hinges that are integrally molded into the walls/panels. Plastic molded hinges may be attached using any suitable means, including but not limited to welding, adhesive bonding or other bonding, riveting, via threaded fasteners or by other fastening means. The hinges could also either be spring-loaded to provide assisted opening or closing means, or "soft" rotational behavior, or be simple free-rotating hinges.

The interface between hinged members may include features that promote an interlocked relationship, to prevent movement of the hinged members beyond their intended position. These features may be molded directly into the respective hinged members, or may form part of the hinges used between the members in question. It will be appreciated that features to prevent overextension of articulating members are known, and it is envisioned that a variety of such features may be suitably implemented. It will also be appreciated that these features may also be used to provide additional load-bearing, stability, and vibration dampening to the overall structure. For example, shown in FIGS. 14a to 14d is the implementation of a plurality of pivot restriction elements 160 provided on the outer floor panel 62. On deployment of the cargo box assembly 10, that is on pivoting the outer floor panel 62 to the deployed arrangement shown in FIGS. 14c and 14d, the pivot restriction elements 160 engage the inner floor panel 60, to prevent any further rotation about pivot axis A.

In some embodiments, additional engagement features may be incorporated to releasably lock structural members (i.e. panels, walls, etc.) in the stowed or deployed position. For example, additional engagement features may be added at the interface between the forward and rearward collapsible walls 68a, 68b and the folding floor assembly 58 to ensure the collapsible walls 68a, 68b are retained in position once deployed. The use of these engagement features may also provide additional stiffness and rigidity to the overall structure.

Mount

The cargo box assembly 10 may be mounted within the cargo bed 24 in a variety of ways. For example, in one mounting embodiment, the cargo box assembly 10 may be mounted directly to the sheet metal defining the side wall section 30a, 30b. In this way, suitable hardware would be used to anchor the base member 50 directly upon the side wall section 32, for example through the use of threaded fasteners.

In another mounting embodiment, the cargo box assembly 10 is mounted within the cargo bed 24 using a clamping system configured to engage the sheet metal lip defining the bed rail 42. The clamping system would be mounted on the base member 50, and would include a plurality of clamps having a suitable tightening means to ensure secure anchorage of the cargo box assembly 10 to the bed rail 42. Clamps can be distributed at intervals along the length of the cargo bed, to allow for multiple mounting points. The clamps could be positioned along the length of the side wall either independently, or collectively through use of a cross member that defines the fixed relative positions of the clamps with respect to each other. The clamps would be made of a strong material, such as steel, stainless steel, or aluminum, or engineered plastics and elastomeric materials, or a combination of these.

In other mounting embodiments a 'press-fit' installation may be used. For example, in some embodiments, the base member 50 may have associated therewith include a telescoping fixture that permits it to be securely mounted between the cargo floor 26 and the underside of the bed rail 42, without the use of fasteners and the requirement to drill holes in the cargo bed. The telescoping fixture may be spring actuated, or otherwise configured to establish a frictional fit between the upper and lower ends of the telescoping fixture and the corresponding receiving surfaces, namely the underside of the bed rail and the cargo bed, therein retaining the base in position.

Stowed Position

Figure 5B:
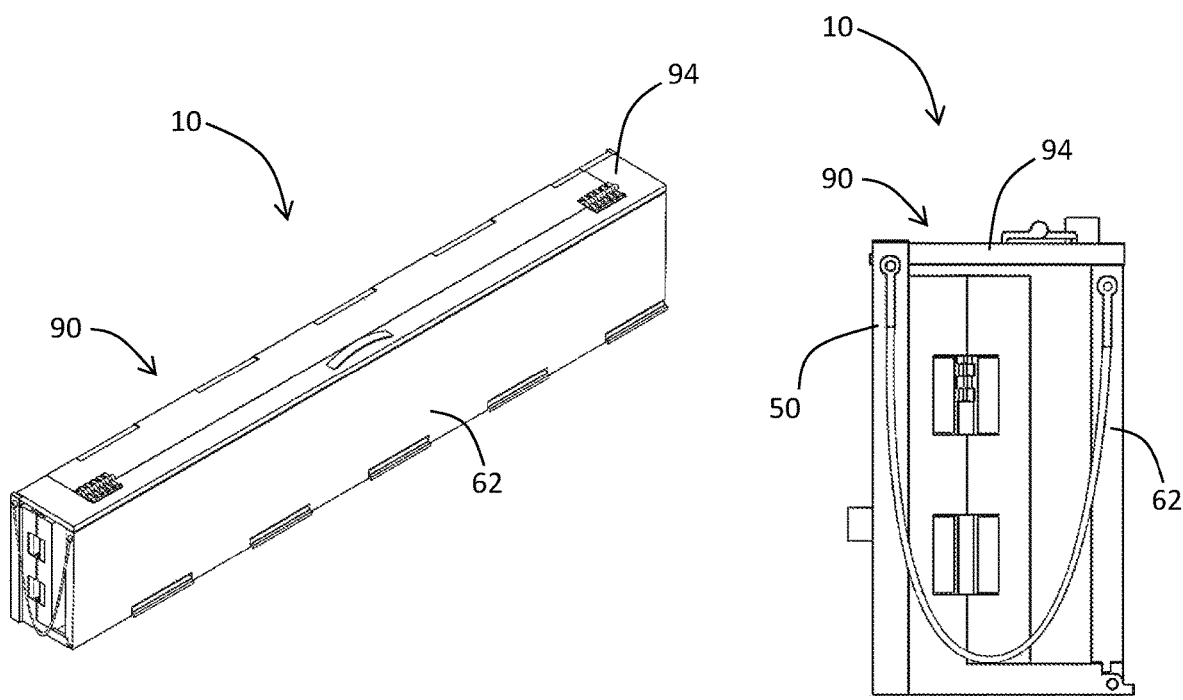
Figure 5C:
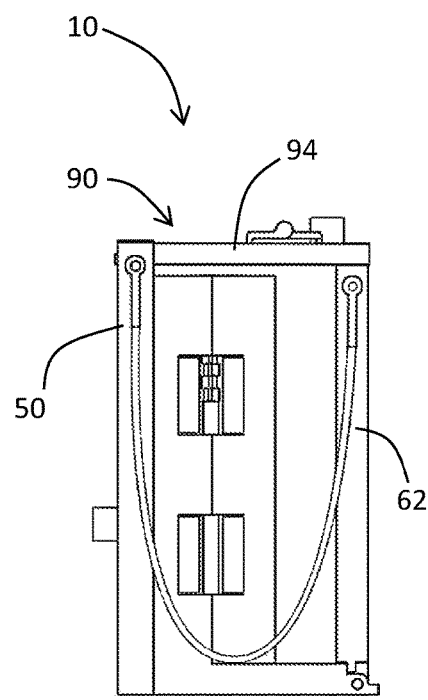
Figure 6A:
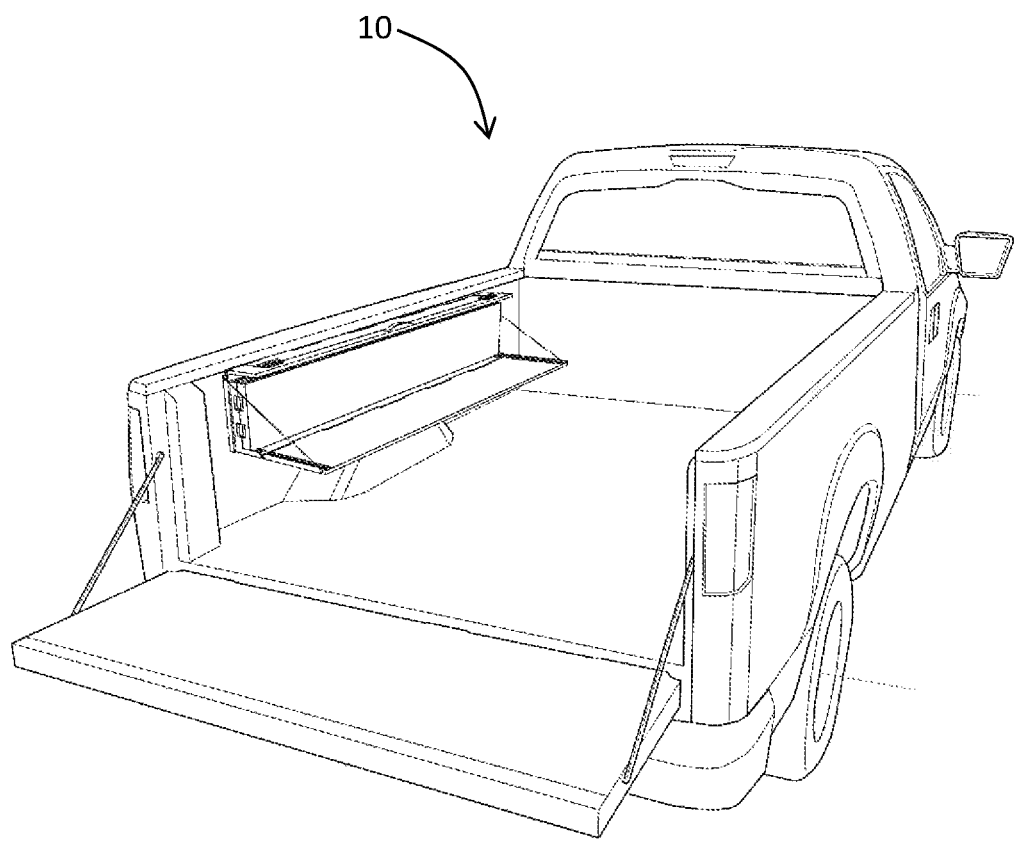
FIGS. 6a to 6e provide details on the expandable cargo box assembly according to FIG. 2, shown at a first step in the deployment of the assembly.
Figure 6B:
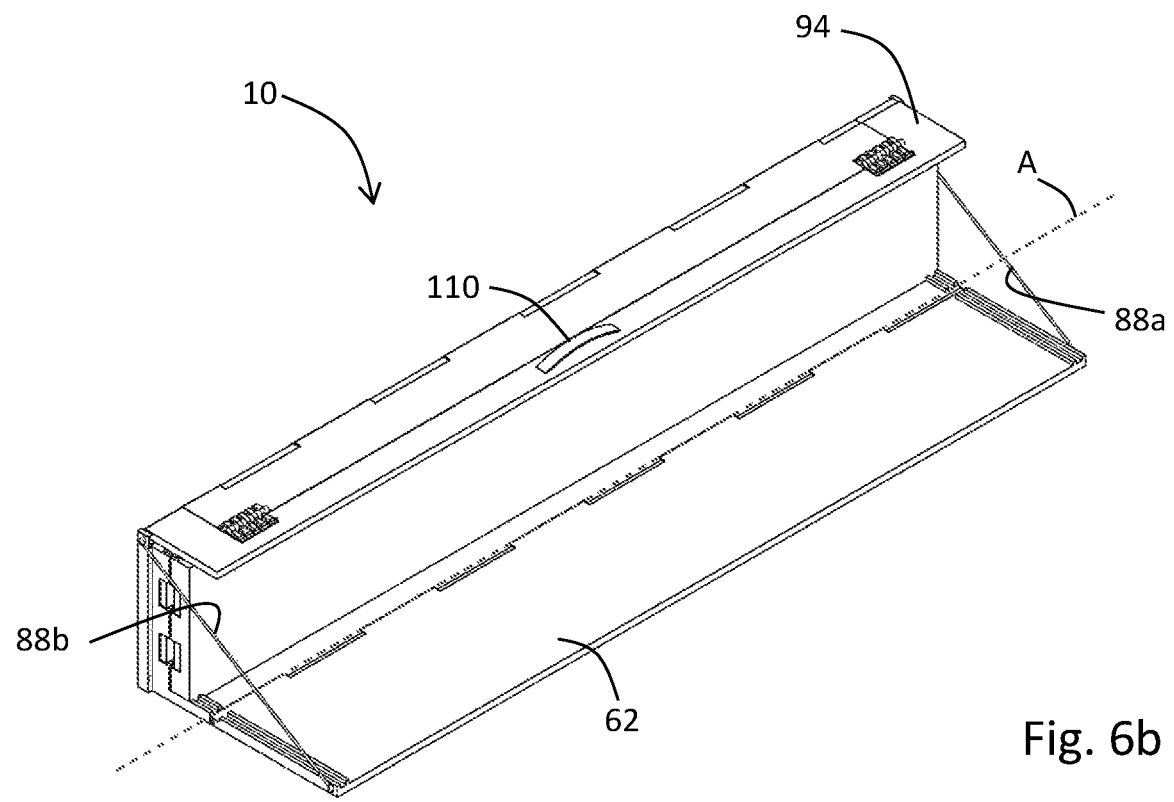
Figure 6C:
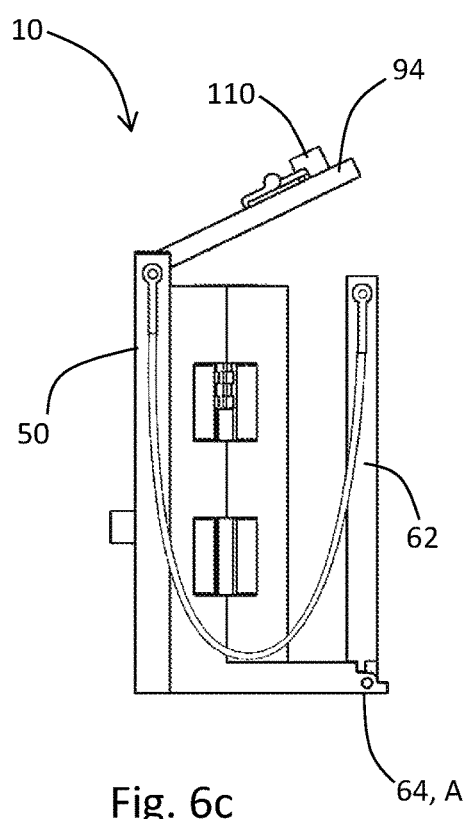
Figure 6D:
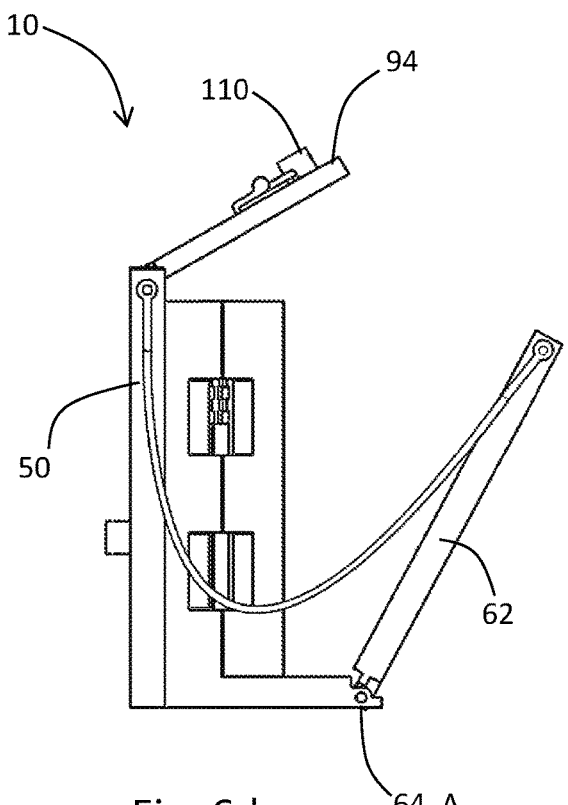
Figure 6E:
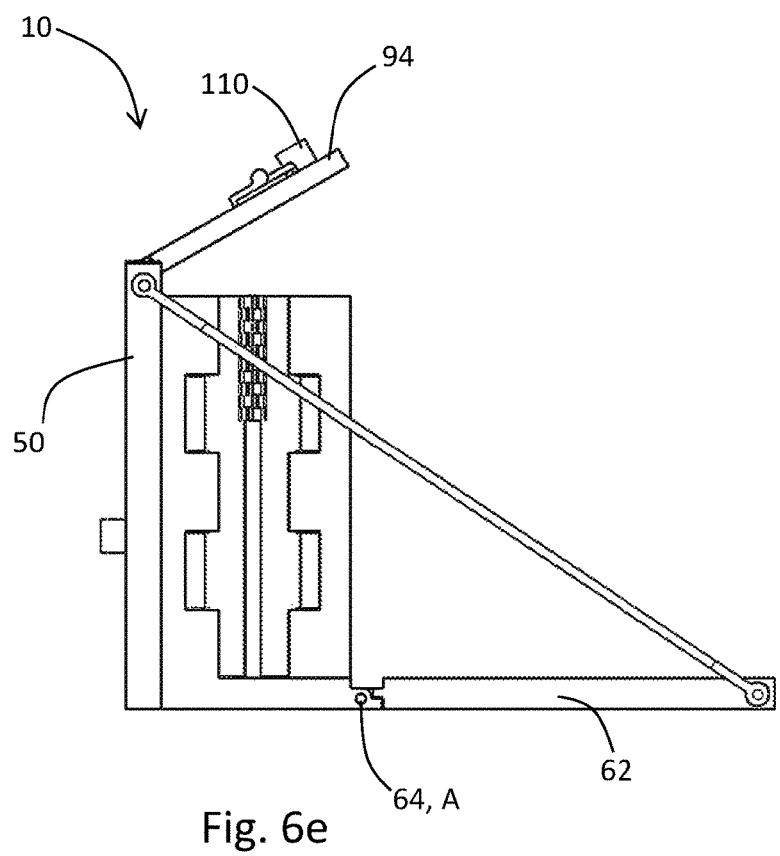

The fully stowed position of the cargo box assembly 10 is shown in FIGS. 5a to 5c. In the fully collapsed or stowed state, the second lid member 94 of the lid assembly 90 engages an edge facing of the outer floor panel 62. To enable the cargo box assembly 10 to be releasably retained in this position, the cargo box assembly 10 may incorporate suitable locking and or latching hardware to provide releasable engagement between the lid assembly 90 and the outer floor panel 62. Other retaining means such as snap fits may also be suitably implemented. The locking or latching hardware may comprise a simple mechanical lever or catch that allows the system to be deployed with or without the use of a key, or other access control device.

Deployment

The first step in the deployment of the cargo box assembly 10 is shown in FIGS. 6a to 6e. The first step in deployment is to unlock or unlatch the second lid member 94 relative to the outer floor panel 62. Once unlocked or unlatched, the second lid member 94 is disengaged from the outer floor panel 62, allowing the outer floor panel 62 to rotate downwards by way of the hinge 64 defining pivot axis A. To facilitate disengagement of the second lid member 94 from the outer floor panel 62, the user may pull upon the first handle 110.

Figure 7A:
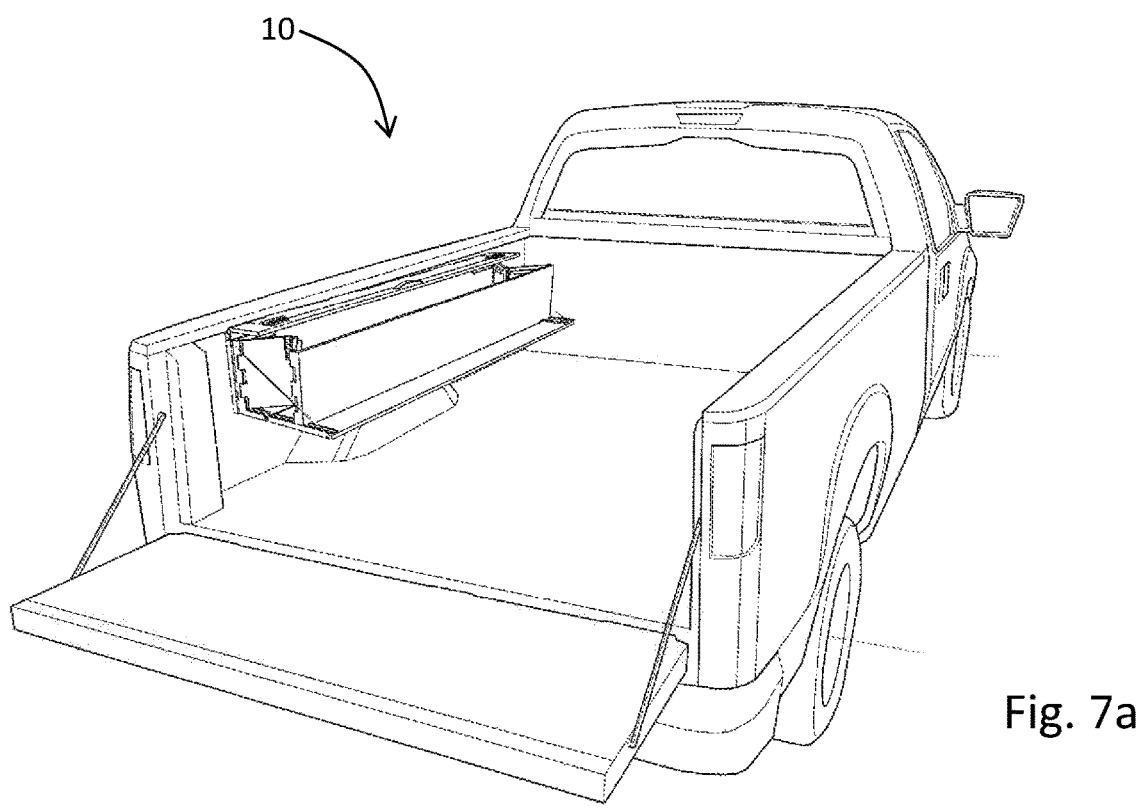
FIGS. 7a to 7c provide details on the expandable cargo box assembly according to FIG. 2, shown at a second step in the deployment of the assembly.
Figure 7B:
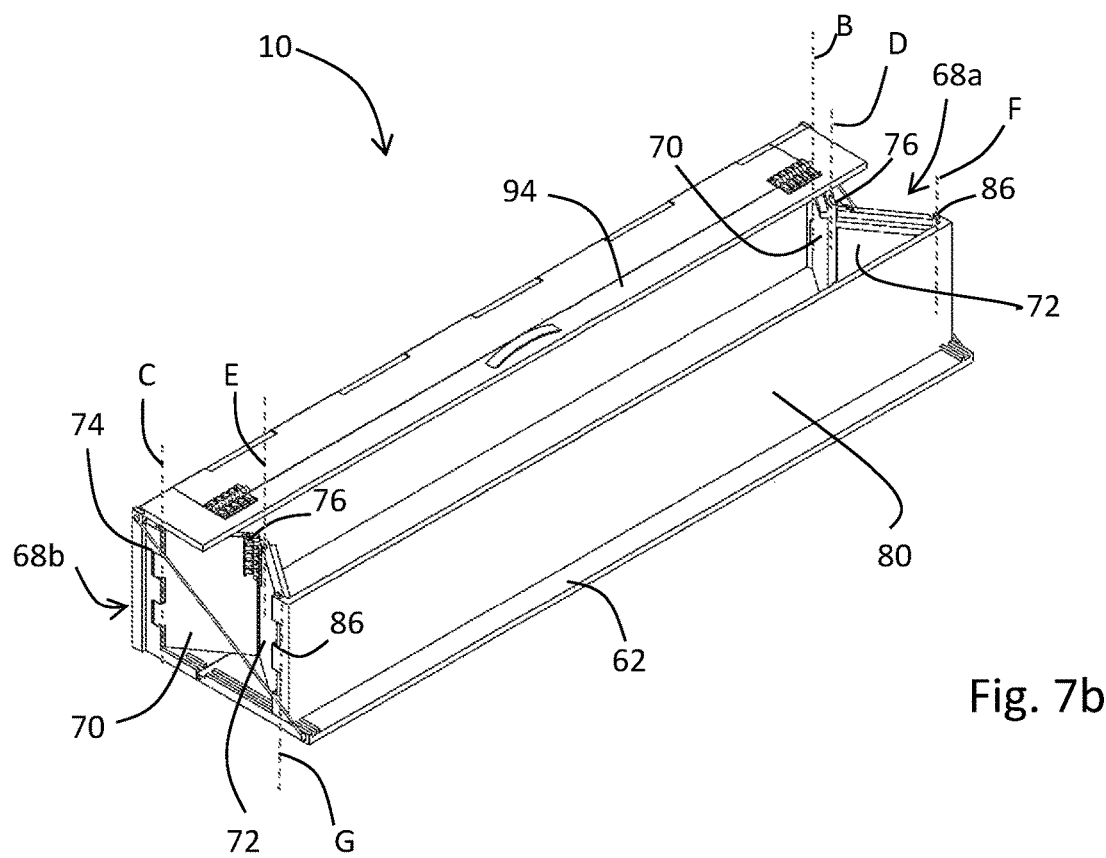
Figure 7C:
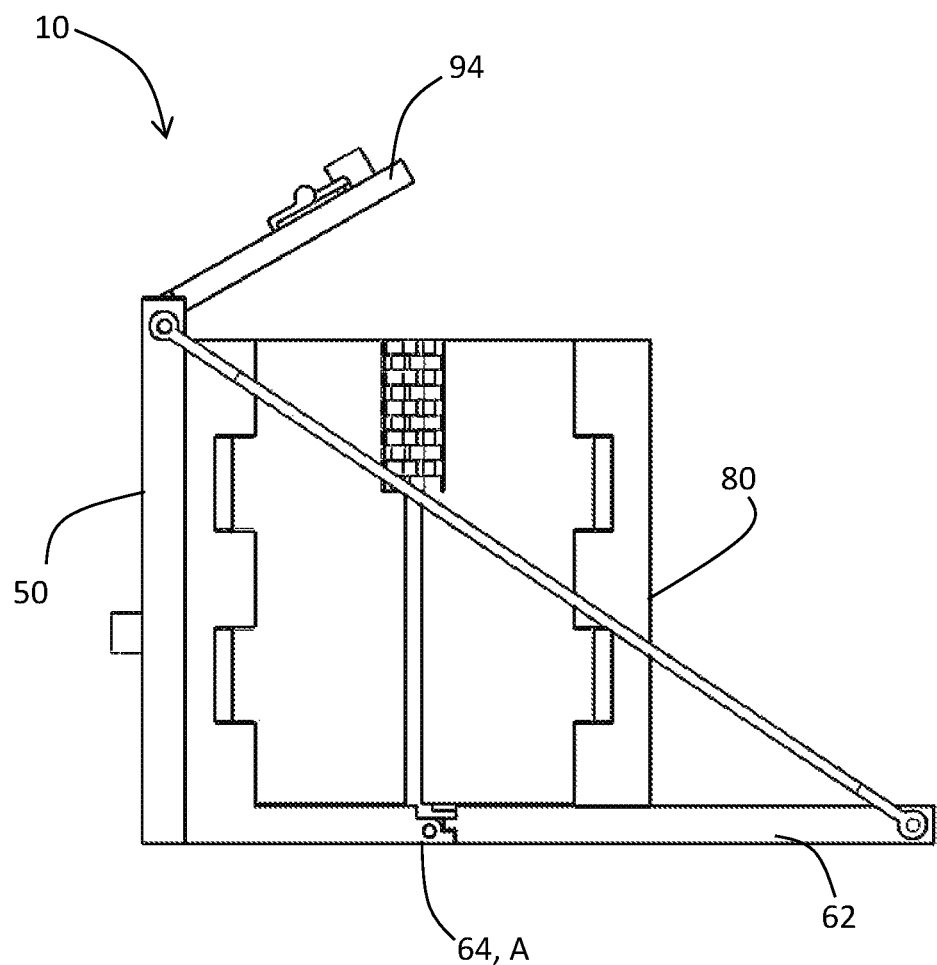
Figure 11:
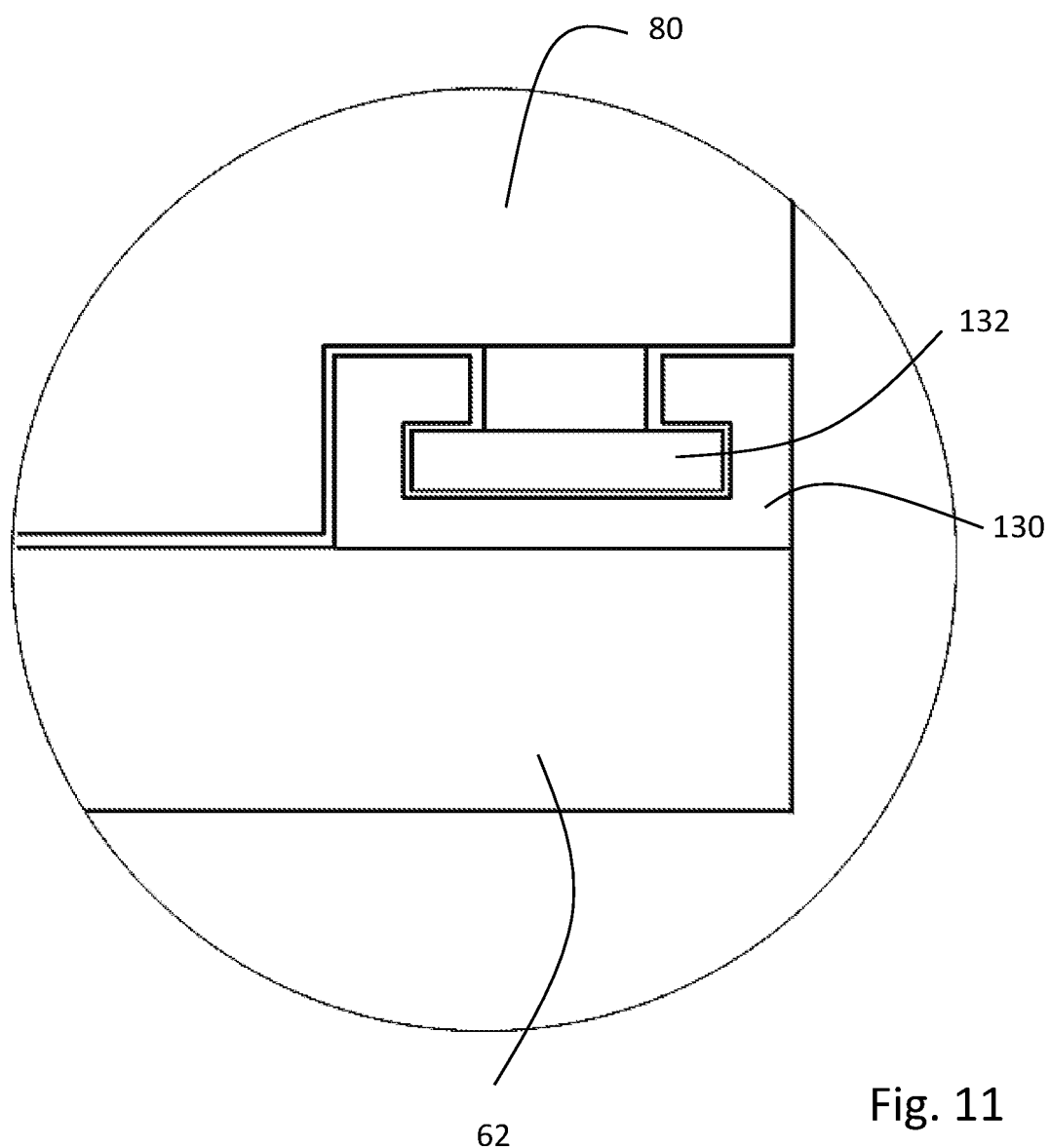
FIG. 11 is a detailed view of the interface between the bottom of an inner wall plate and an outer floor panel.

The second step in the deployment of the cargo box assembly 10 is shown in FIGS. 7a to 7c. Once the outer floor panel 62 reaches approximately 90° relative to the base member 50, the inner wall plate 80 is moved inboard, that is towards the longitudinal centerline of the cargo bed 24. Displacement of the inner wall plate 80 in this way causes the forward and rearward collapsible walls 68a, 68b to deploy such that the first and second wall members 70, 72 move towards planar alignment. During deployment, with respect to the forward collapsible wall 68a, the first and second wall members 70, 72 pivot at hinges 74, 76, and 86 defining pivot axes B, D, and F, respectively. Similarly, during deployment, with respect to the rearward collapsible wall 68b, the first and second wall members 70, 72 pivot at hinges 74, 76, and 86 defining pivot axes C, E, and G, respectively. To facilitate the displacement of the inner wall plate 80 to the inboard position, the outer floor panel 62 may include one or more features such as grooves, tracks, or rails, that interface with a registration feature provided on the bottom of the moving inner wall plate 80, so as to guide it along a fixed translational path. An exemplary configuration is shown in FIG. 11, where the outer floor panel 62 includes a slot 130 at the forward and rearward ends that cooperates with a registration feature 132 provided on the inner wall plate 80. The interface and registration of the slot 130 and registration features 132 also serves to control the distance between the bottom of the inner wall plate 80 and the pivoting outer floor panel 62, ensuring that the outer floor panel 62 does not pivot and drop lower than a horizontal position.

The deployment of the inner wall plate 80 in the inboard direction may be facilitated through the application of a biasing force. The biasing force may be applied by the user, by urging the first and second wall members 70, 72 of the respective forward and rearward collapsible walls 68a, 68b into planar alignment. Alternatively, one or more of the hinges 74, 76, and 84 defining the various pivot axes on each of the forward and rearward collapsible walls 68a, 68b may incorporate a spring or other internal biasing member to urge the first and second wall members 70, 72 of the respective forward and rearward collapsible walls 68a, 68b into planar alignment.

Figure 8B:
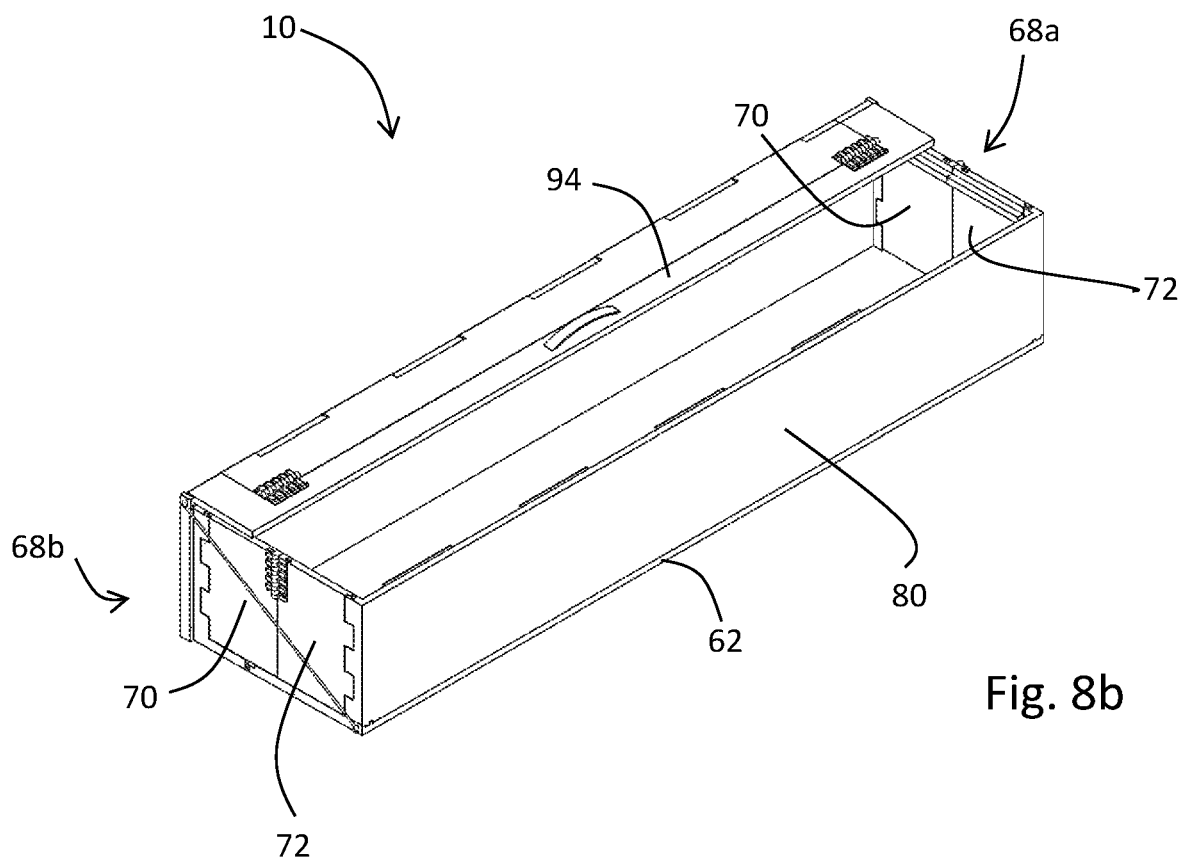
Figure 8C:
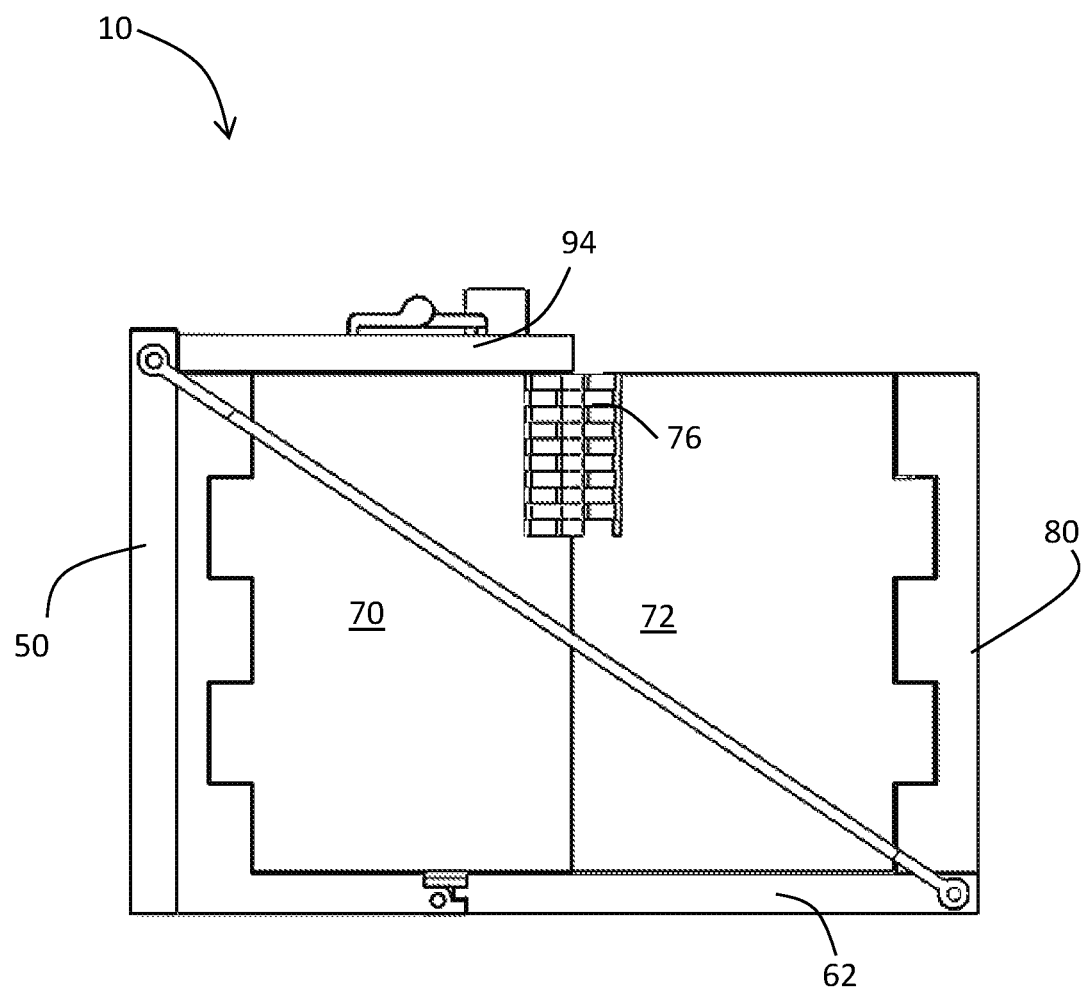

The third step in the deployment of the cargo box assembly 10 is shown in FIGS. 8a to 8c. Once the forward and rearward collapsible walls 68a, 68b have rotated to their fully deployed position, that is when the first and second wall members 70, 72 of the respective forward and rearward collapsible walls 68a, 68b are in planar alignment, the full cargo carrying capacity of the cargo box assembly 10 is established.

Figure 9A:
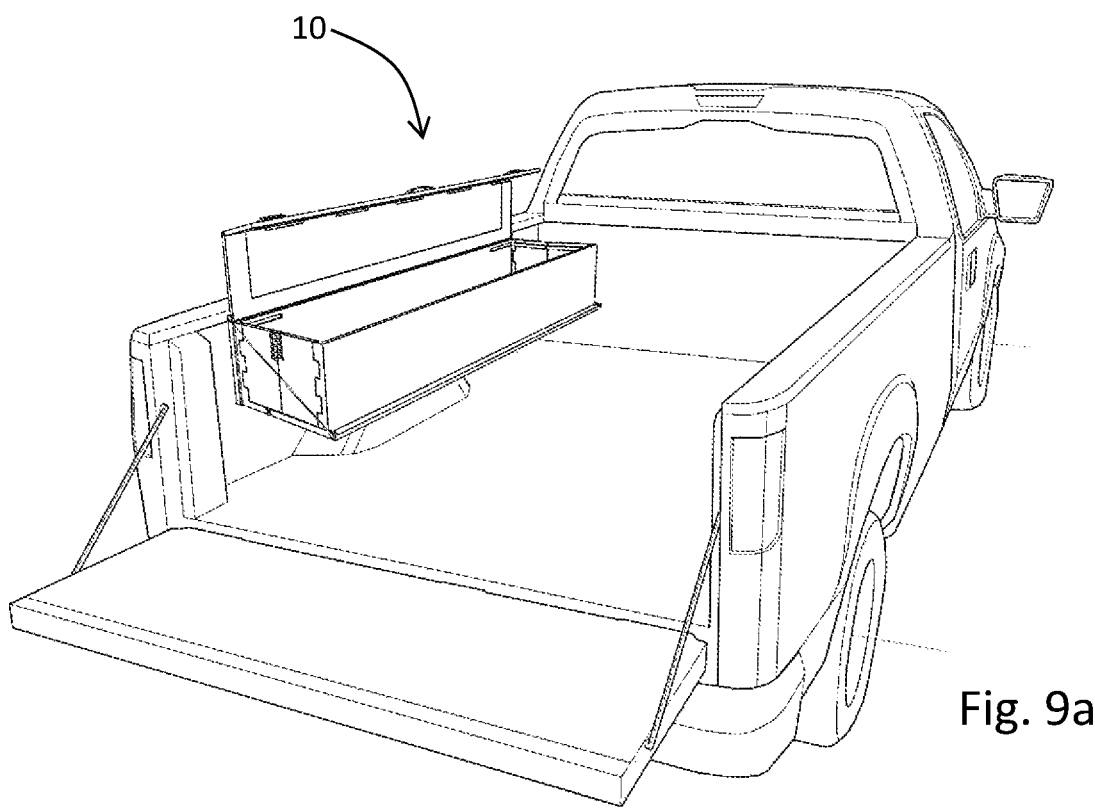
FIGS. 9a to 9c provide details on the expandable cargo box assembly according to FIG. 2, shown at a fourth step in the deployment of the assembly.
Figure 9B:
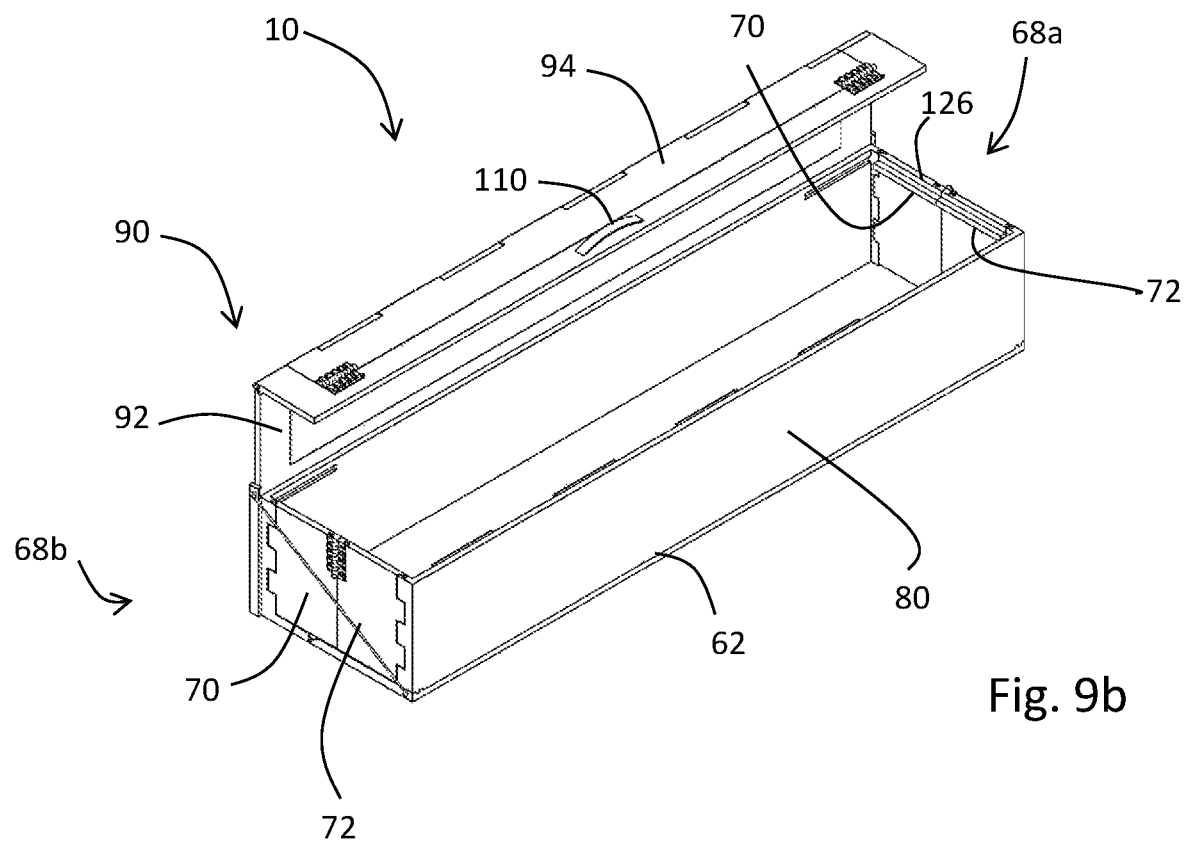
Figure 9C:
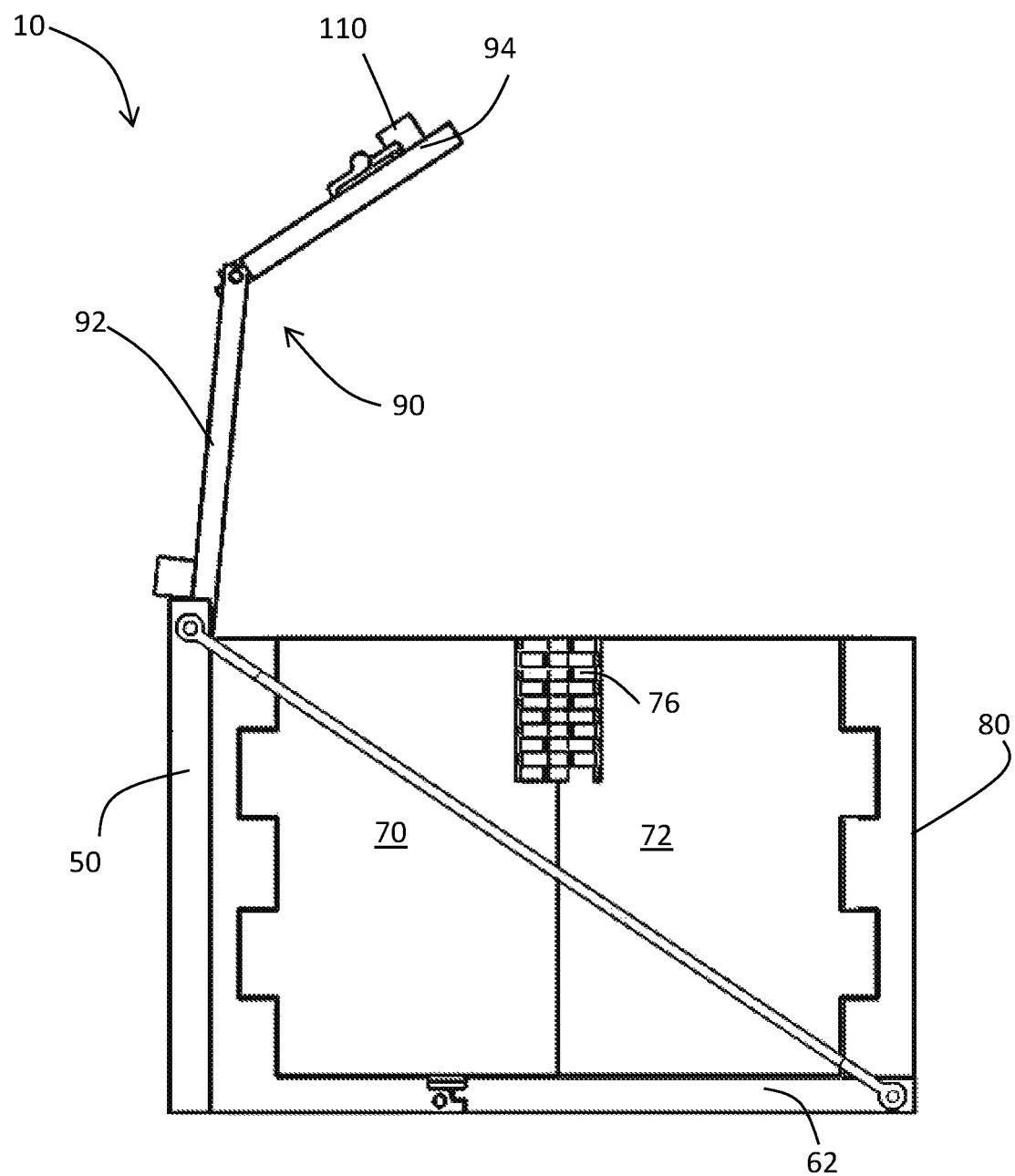

The fourth step in the deployment of the cargo box assembly 10 is shown in FIGS. 9a to 9c. The handle 110 provided on the second lid member 94 is used to lift the lid assembly 90. In this way, the first lid member 92 is released from the pocket between the first and second channels 120, 122 of the base member 50.

Figure 10B:
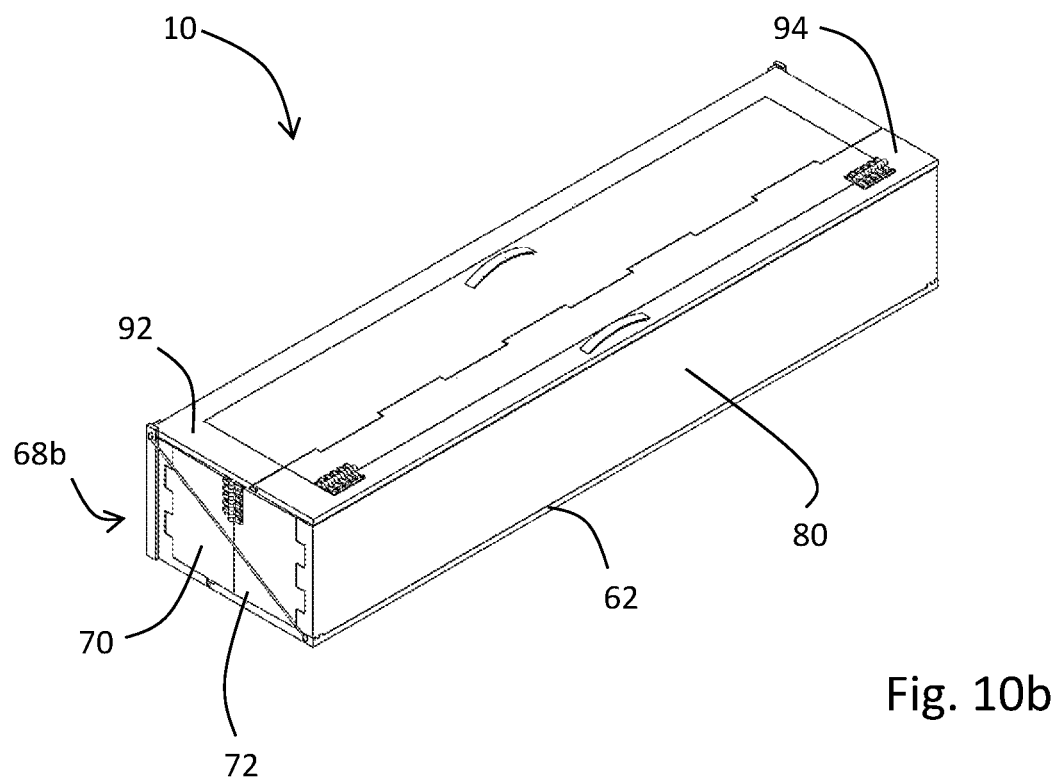
Figure 10C:
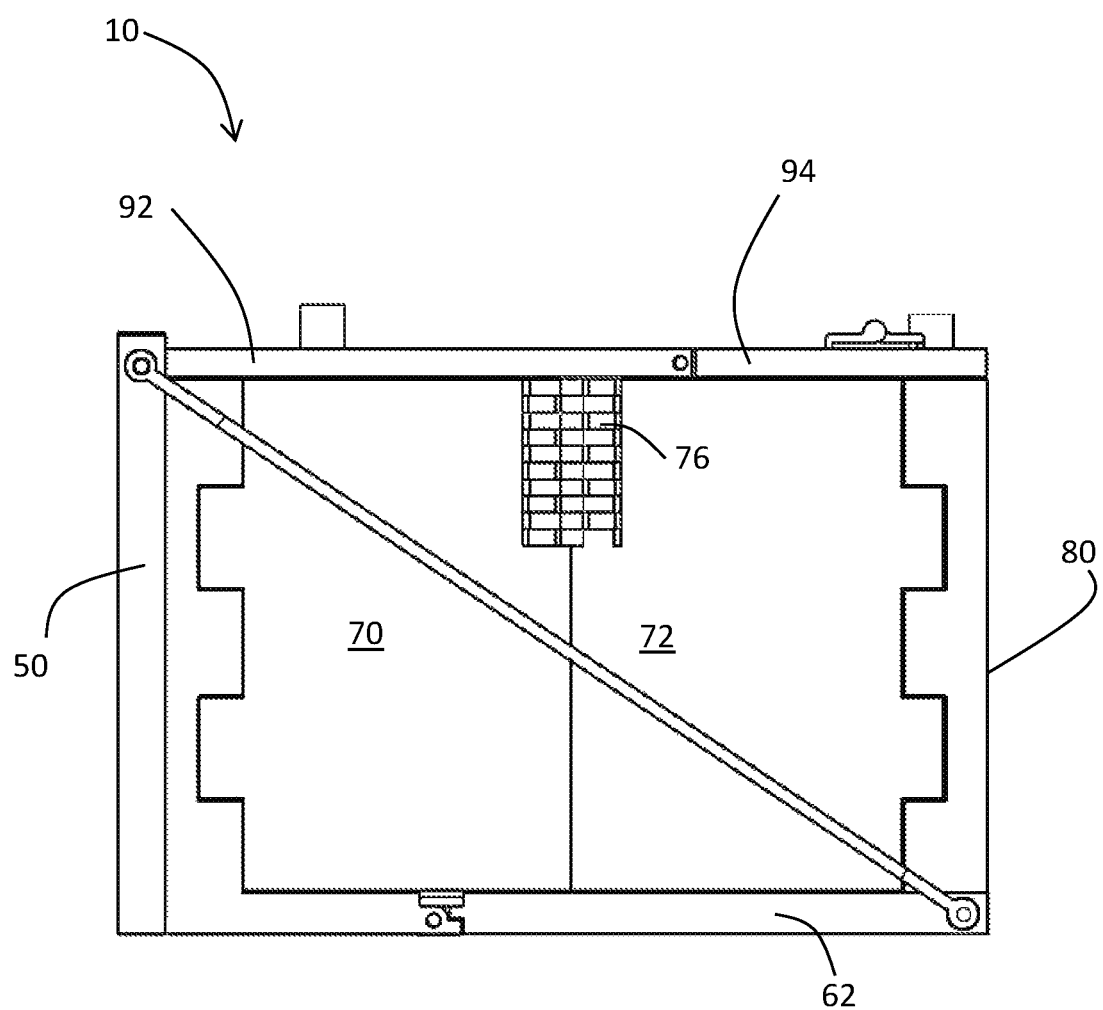

The fifth step in the deployment of the cargo box assembly 10 is shown in FIGS. 10a to 10c. The guide members 124 provided on the first lid member 92 allow the lid assembly 90 to rotate from the generally upright configuration of step 4 shown in FIGS. 9a to 9c, to the generally horizontal position shown in FIGS. 10a to 10c. Once the lid assembly 90 has covered the cargo area of the box, it can be said that the structure is in a fully deployed state. The lid assembly 90 is envisioned to interface with the inner wall plate 80, the forward and rearward collapsible walls 68a, 68b using features that may include mechanical locking or other means to prevent unintentional opening of the lid. The features may also include access control devices such as a key-lock, knobs, or other devices used to prevent unintentional access to the cargo area. In addition, the lid assembly 90 may engage upon a seat or other similar structure provided on an outer edge or on an inside surface of one or more of the inner wall plate 80 and forward and rearward collapsible walls 68a, 68b to denote the limit of closure, to prevent the lid assembly 90 from falling into the cargo box. As shown for example in FIG. 9b, the outer wall plate 52 and at least the forward collapsible wall 68a provides a seat 126.

Alternatives

Figure 12A:
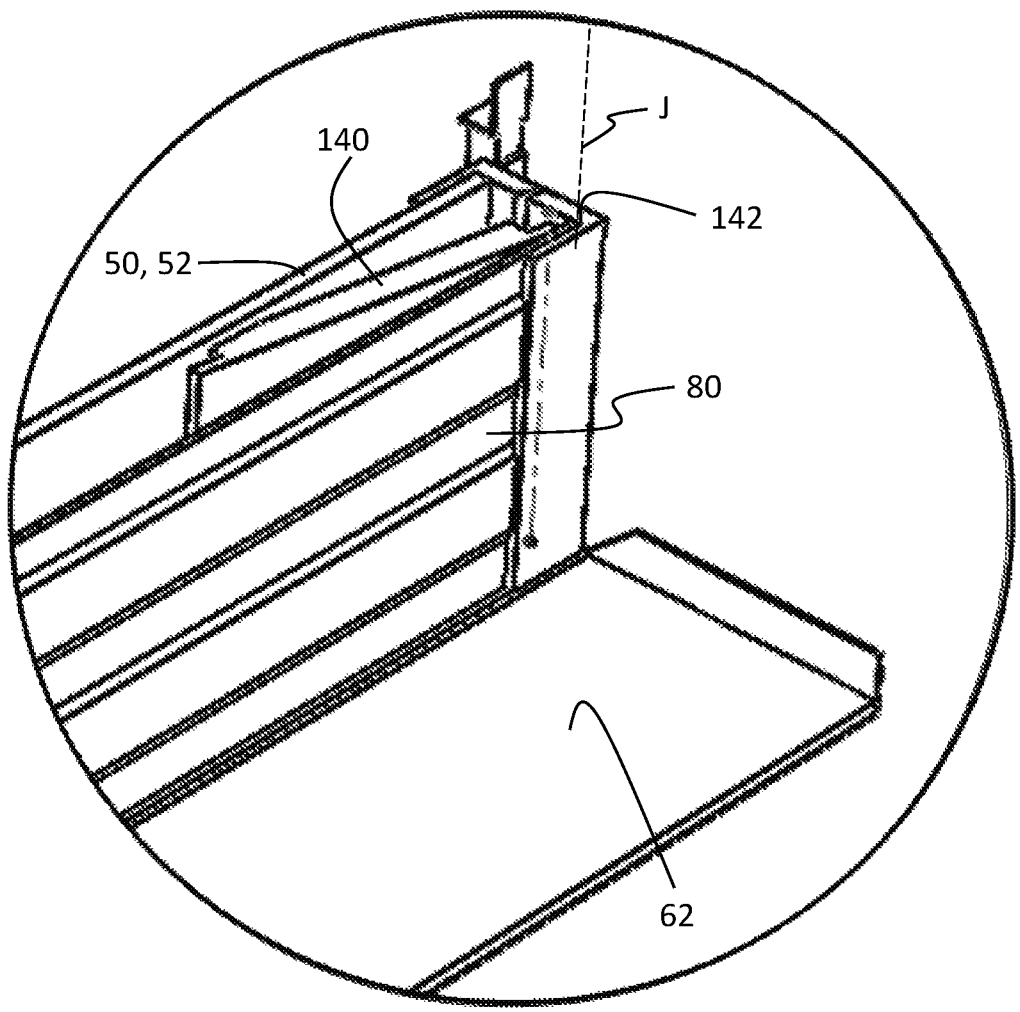
FIGS. 12a to 12c detail an alternative embodiment wherein a folding wall arrangement is used at forward and rearward ends of the expandable cargo box assembly.
Figure 12B:
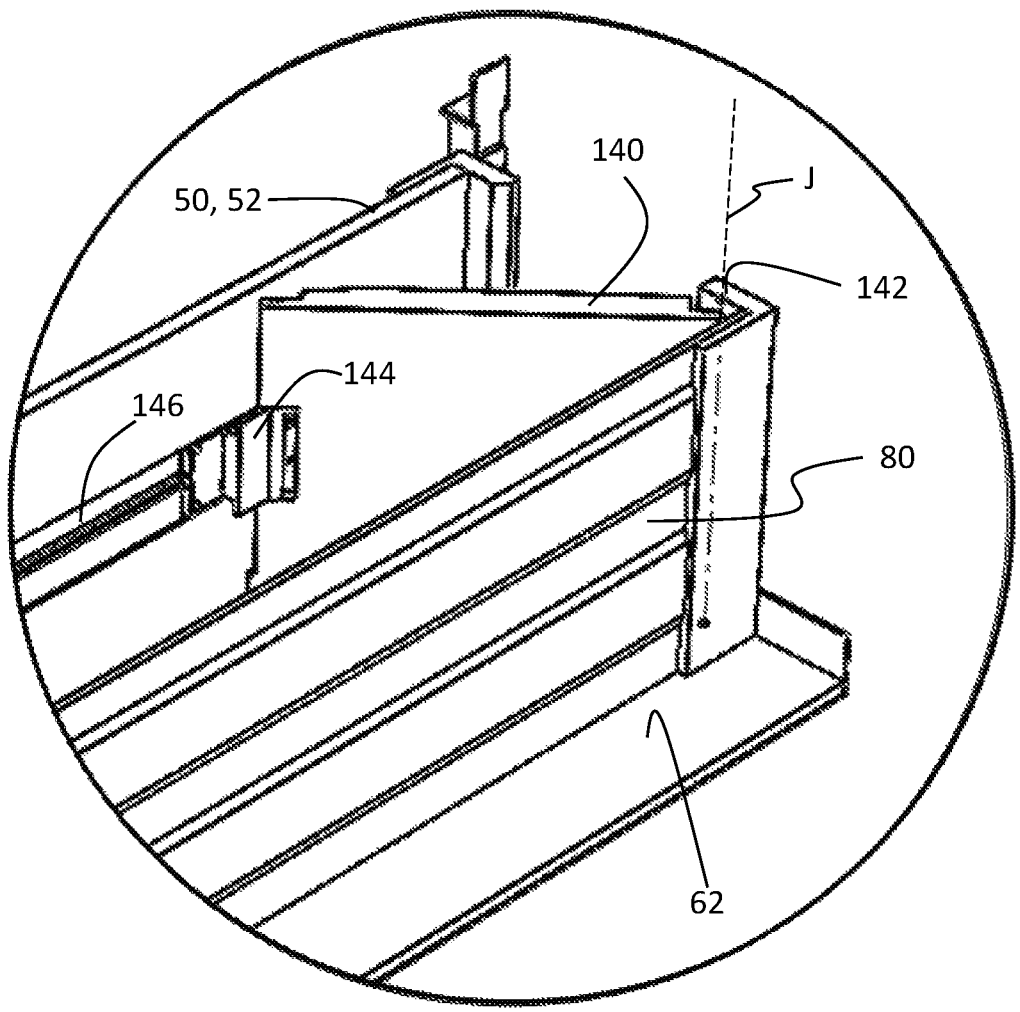
Figure 12C:
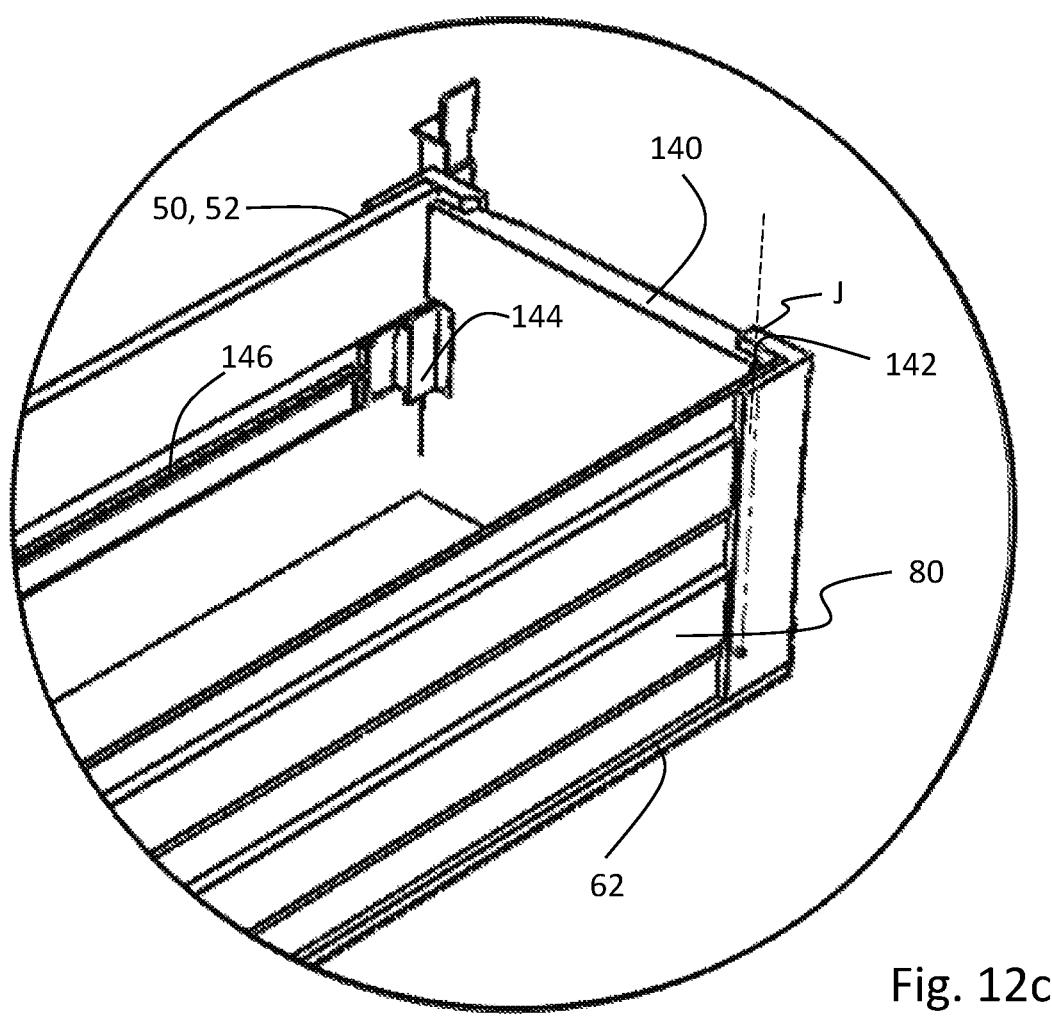

In the embodiments detailed above, at each of the forward and rearward ends 54, 56 of the base member 50 there is operably mounted the respective collapsible wall 68a, 68b. In an alternative embodiment, each of these collapsible walls may be constructed as a single piece, configured to pivot about a single axis during deployment from the stowed position to the deployed position. This alternative arrangement is shown in FIGS. 12a to 12c. As both the forward and rearward walls are configured in a similar manner, only the forward wall is described in detail. As shown, a folding wall 140 is pivotally connected to the inner wall plate 80 by way of a suitable hinge 142, arranged to permit the folding wall 140 to pivot about pivot axis J. The folding wall 140 also includes a guide element 144 that interfaces with a guide channel 146 provided in the outer wall plate 52. During deployment, as the folding wall 140 pivots about the pivot axis J, the guide element 144 slides along the guide channel 146. The interface between the guide element 144 and the guide channel 146 is mechanically locked to permit for the required sliding action, but also to serve as a load bearing sliding attachment between the folding walls and the outer wall plate 52.

Figure 13A:
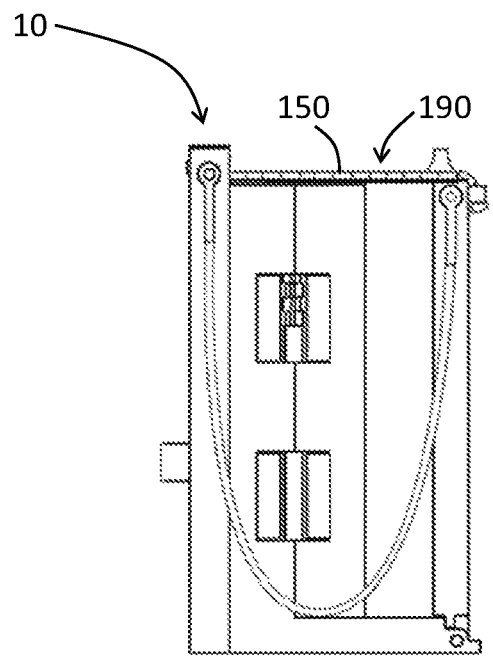
FIGS. 13a and 13b detail an alternative embodiment where a lid assembly is provided in the form of a rolling shutter.
Figure 13B:
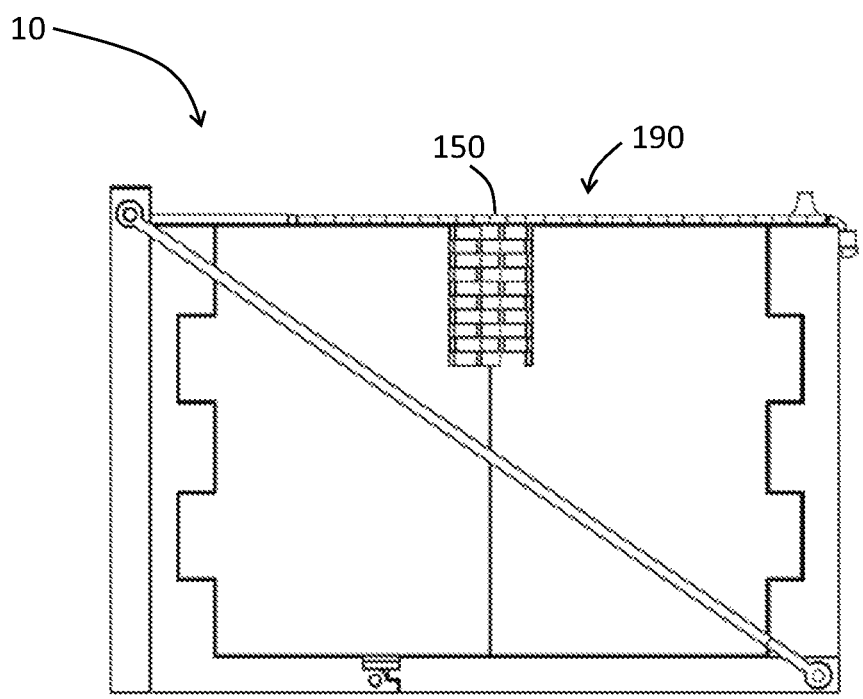
Figure 14A:
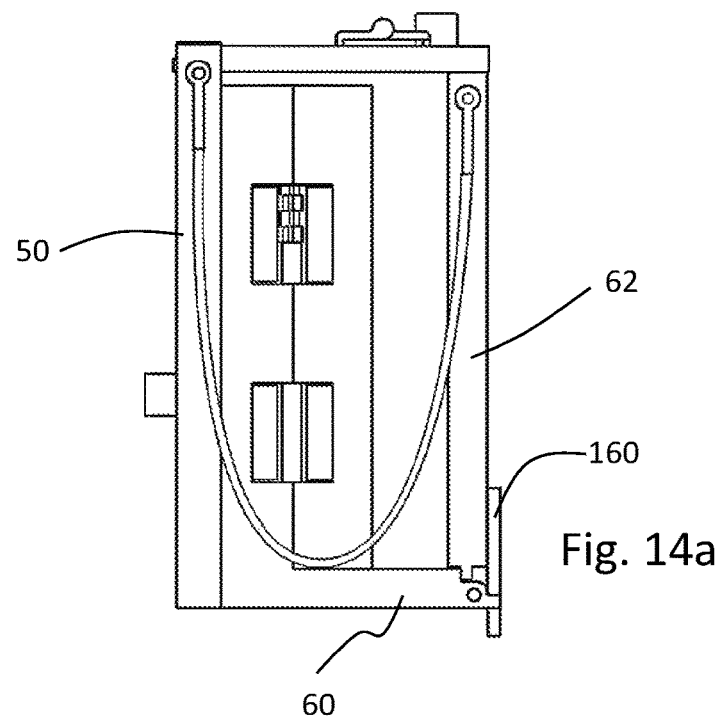
FIGS. 14a to 14d detail an alternative embodiment where a restriction element is provided on the outer floor panel, to limit the extent of rotation of the outer floor panel during deployment.
Figure 14B:
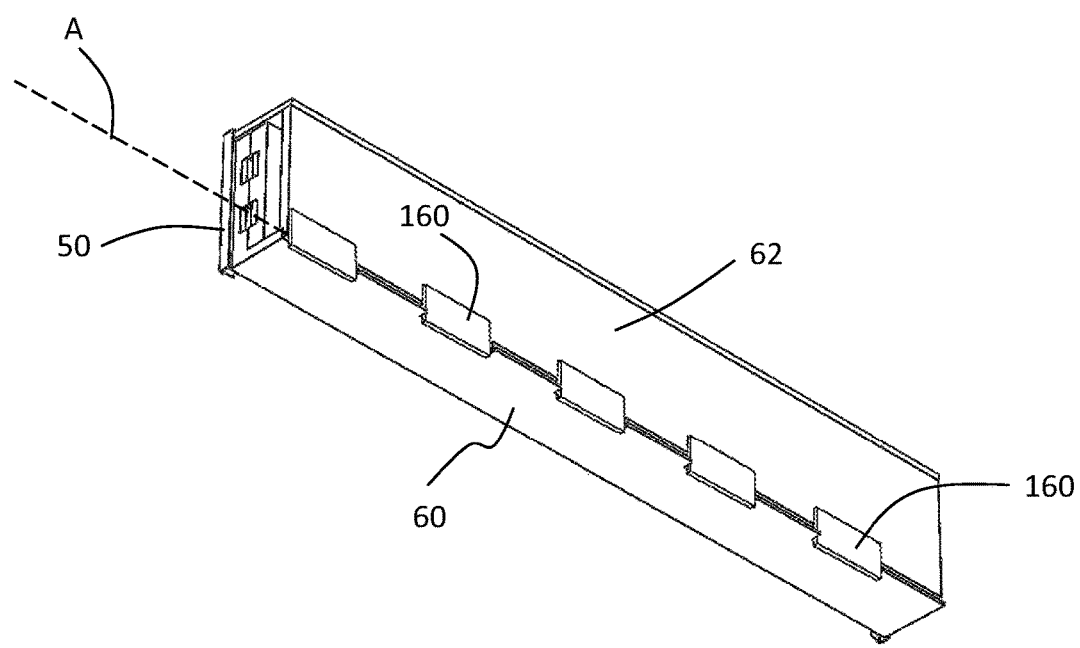
Figure 14C:
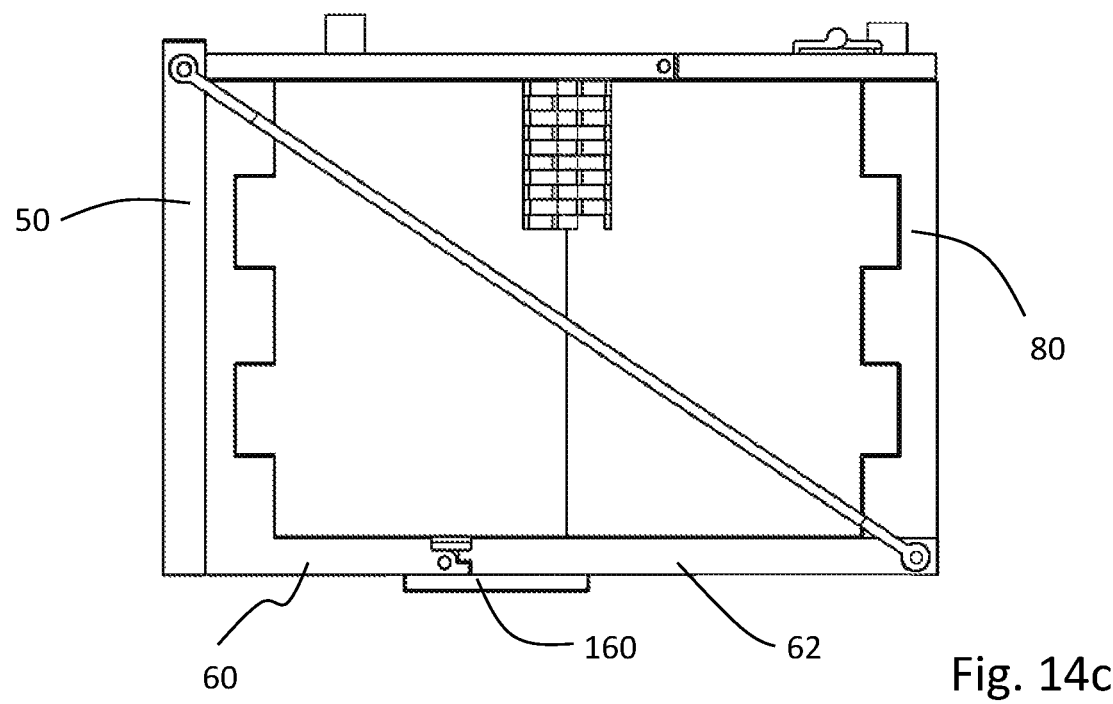
Figure 14D:
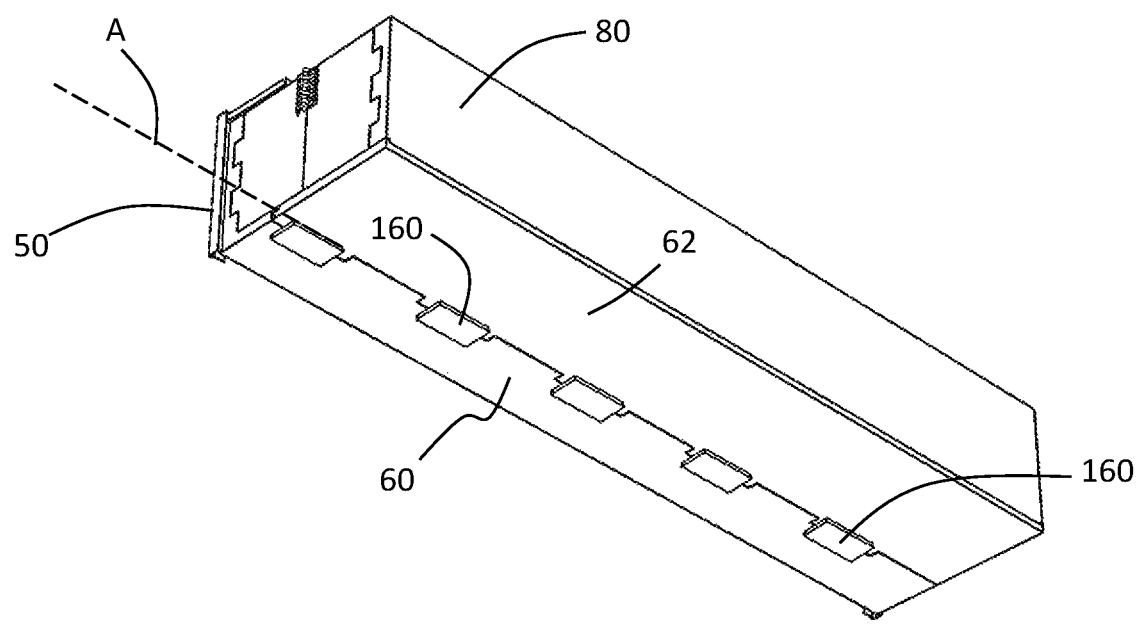

Although the lid assembly 90 has been exemplified as having two principle pivoting members, namely the first and second lid members 92, 94, other possible lid configurations are possible. For example, a lid assembly 190 for the cargo storage assembly 10 may also be constructed of individual slats or members to form a "rolling shutter." An exemplary rolling shutter lid assembly 150 is shown in FIG. 13.

In the embodiments detailed above, the cargo box assembly 10 includes support members 88a, 88b to provide additional load-bearing support to the assembly. As an alternative, or in addition to the support members 88a, 88b, the cargo box assembly 10 may include supporting members that extend from below the cargo box assembly, for example from the distal end of the outer floor panel to the bed floor 26, or to the side wall portion 32, or the corner defined therebetween. In yet another alternative arrangement, the additional supporting members may extend from the sides of the cargo box assembly. Regardless of the arrangement, the use of additional supporting members is intended to provide additional stability, vibration or noise dampening, load-bearing, structural rigidity and/or other performance enhancements, as required. Additional supporting members may be made of either steel, stainless steel, aluminum, or engineered plastics and/or elastomeric materials.

While various embodiments according to the present invention have been described above, it should be understood that they have been presented by way of illustration and example only, and not limitation. It will be apparent to persons skilled in the relevant art that various changes in form and detail can be made therein without departing from the scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other combination. All patents and publications discussed herein are incorporated by reference herein in their entirety.

What is claimed is:

1. An expandable cargo box assembly for mounting on a side wall section of a cargo bed, the cargo box assembly comprising:
   a base member for attaching the expandable cargo box assembly to the side wall section, the base member supporting a folding floor assembly and forward and rearward collapsible walls at each end of the base member; and
   an inner wall plate attached to the forward and rearward collapsible walls opposite to the base member,
   wherein the base member, the folding floor assembly, the forward and rearward collapsible walls and the inner wall plate collectively define an expandable enclosure that can be positioned in a stowed position when not in use and is configured to expand to a deployed position to receive cargo, and
   wherein the folding floor assembly includes an inner floor panel and an outer floor panel, wherein the inner floor panel is fixedly attached perpendicularly to a lower longitudinal edge of the base member, and wherein the outer floor panel is pivotally connected to the inner floor panel.

2. The expandable cargo box assembly according to claim 1, wherein each of the forward and rearward collapsible walls includes a first wall member and a second wall member, wherein the first wall member is pivotally attached to the base member, the second wall member is pivotally attached to the inner wall plate, and the first and second wall members are pivotally attached to each other.

3. The expandable cargo box assembly according to claim 1, wherein the outer floor panel includes at least one slot that slidingly engages a corresponding registration feature provided on a bottom surface of the inner wall plate.

4. The expandable cargo box assembly according to claim 1, further comprising a lid assembly.

5. The expandable cargo box assembly according to claim 4, wherein the lid assembly includes a first lid member and a second lid member, the second lid member being pivotally attached to the first lid member.

6. The expandable cargo box assembly according to claim 5, wherein the second lid member and the first lid member are configured to pivot about a pivot axis, and wherein the lid assembly includes an access port having a first access panel and a second access panel, the first and second access panels being pivotally attached to each other and configured to pivot about the pivot axis, and wherein the second access panel is pivotally attached to the second lid member.

7. The expandable cargo box assembly according to claim 5, wherein the first lid member is configured to nest within a pocket defined by the base member when the cargo box assembly is arranged in the stowed position.

8. The expandable cargo box assembly according to claim 7, wherein the pocket is defined by a first channel located at a forward end of the base member and a second channel located at a rearward end of the base member, the first lid member having at each end a guide member positioned within the respective first and second channels to facilitate movement of the lid assembly from the stowed position to the deployed position.

9. The expandable cargo box assembly according to claim 1, further comprising a forward support member and a rearward support member to provide additional load-bearing support to the assembly, the forward and rearward support members extending from an upper anchorage point on the base member diagonally down to a distal end of the outer floor panel.

10. An expandable cargo box assembly for mounting on a side wall section of a cargo bed, the cargo box assembly comprising:
a base member for attaching the expandable cargo box assembly to the side wall section, the base member supporting a folding floor assembly and forward and rearward collapsible walls at each end of the base member;
an inner wall plate attached to the forward and rearward collapsible walls opposite to the base member; and
a lid assembly, wherein the lid assembly includes a first lid member and a second lid member, the second lid member being pivotally attached to the first lid member,
wherein the base member, the folding floor assembly, the forward and rearward collapsible walls and the inner wall plate collectively define an expandable enclosure that can be positioned in a stowed position when not in use and is configured to expand to a deployed position to receive cargo, and
wherein the first lid member is configured to nest within a pocket defined by the base member when the cargo box assembly is arranged in the stowed position.

11. The expandable cargo box assembly according to claim 10, wherein the pocket is defined by a first channel located at a forward end of the base member and a second channel located at a rearward end of the base member, the first lid member having at each end a guide member positioned within the respective first and second channels to facilitate movement of the lid assembly from the stowed position to the deployed position.

12. The expandable cargo box assembly according to claim 10, wherein each of the forward and rearward collapsible walls includes a first wall member and a second wall member, wherein the first wall member is pivotally attached to the base member, the second wall member is pivotally attached to the inner wall plate, and the first and second wall members are pivotally attached to each other.

13. The expandable cargo box assembly according to claim 10, wherein the folding floor assembly includes an inner floor panel and an outer floor panel, wherein the inner floor panel is fixedly attached perpendicularly to a lower longitudinal edge of the base member, and wherein the outer floor panel is pivotally connected to the inner floor panel.

14. The expandable cargo box assembly according to claim 13, wherein the outer floor panel includes at least one slot that slidingly engages a corresponding registration feature provided on a bottom surface of the inner wall plate.

15. The expandable cargo box assembly according to claim 10, wherein the second lid member and the first lid member are configured to pivot about a pivot axis, and wherein the lid assembly includes an access port having a first access panel and a second access panel, the first and second access panels being pivotally attached to each other and configured to pivot about the pivot axis, and wherein the second access panel is pivotally attached to the second lid member.

16. An expandable cargo box assembly for mounting on a side wall section of a cargo bed, the cargo box assembly comprising:
a base member for attaching the expandable cargo box assembly to the side wall section, the base member supporting a folding floor assembly and forward and rearward collapsible walls at each end of the base member;
an inner wall plate attached to the forward and rearward collapsible walls opposite to the base member; and
a forward support member and a rearward support member to provide additional load-bearing support to the assembly, the forward and rearward support members extending from an upper anchorage point on the base member diagonally down to a distal end of an outer floor panel of the folding floor assembly, and
wherein the base member, the folding floor assembly, the forward and rearward collapsible walls and the inner wall plate collectively define an expandable enclosure that can be positioned in a stowed position when not in use and is configured to expand to a deployed position to receive cargo.

17. The expandable cargo box assembly according to claim 16, wherein the folding floor assembly includes an inner floor panel and the outer floor panel, wherein the inner floor panel is fixedly attached perpendicularly to a lower longitudinal edge of the base member, and wherein the outer floor panel is pivotally connected to the inner floor panel.

18. The expandable cargo box assembly according to claim 16, further comprising a lid assembly, wherein the lid assembly includes a first lid member and a second lid member, the second lid member being pivotally attached to the first lid member.

19. The expandable cargo box assembly according to claim 18, wherein the second lid member and the first lid member are configured to pivot about a pivot axis, and wherein the lid assembly includes an access port having a first access panel and a second access panel, the first and second access panels being pivotally attached to each other and configured to pivot about the pivot axis, and wherein the second access panel is pivotally attached to the second lid member.

* * * * *